(12) United States Patent
Jang et al.

(10) Patent No.: US 9,213,481 B2
(45) Date of Patent: Dec. 15, 2015

(54) METHOD FOR JUDGING NUMBER OF TOUCHES

(75) Inventors: Hyung-Uk Jang, Goyang-si (KR); Jong-Hyun Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1106 days.

(21) Appl. No.: 13/253,259

(22) Filed: Oct. 5, 2011

(65) Prior Publication Data
US 2012/0089363 A1    Apr. 12, 2012

(30) Foreign Application Priority Data

Oct. 7, 2010 (KR) .......................... 10-2010-0098000
Sep. 27, 2011 (KR) .......................... 10-2011-0097240

(51) Int. Cl.
G06F 3/041 (2006.01)
G06F 3/0488 (2013.01)
G06F 3/042 (2006.01)

(52) U.S. Cl.
CPC .......... *G06F 3/04883* (2013.01); *G06F 3/0416* (2013.01); *G06F 3/0428* (2013.01); *G06F 2203/04104* (2013.01)

(58) Field of Classification Search
CPC ................ G06F 3/0416; G06F 3/0428; G06F 2203/04104
See application file for complete search history.

(56) References Cited

U.S. PATENT DOCUMENTS

| | | | | |
|---|---|---|---|---|
| 2006/0232792 | A1* | 10/2006 | Kobayashi | 356/621 |
| 2009/0207145 | A1* | 8/2009 | Tsuzaki et al. | 345/173 |
| 2010/0026645 | A1* | 2/2010 | Yim et al. | 345/173 |
| 2010/0193258 | A1* | 8/2010 | Simmons et al. | 178/18.06 |
| 2010/0309171 | A1* | 12/2010 | Hsieh et al. | 345/204 |
| 2010/0315372 | A1* | 12/2010 | Ng | 345/174 |
| 2011/0141062 | A1* | 6/2011 | Yu et al. | 345/175 |
| 2012/0075211 | A1* | 3/2012 | Tsuzaki | 345/173 |

FOREIGN PATENT DOCUMENTS

| | | |
|---|---|---|
| EP | 2093652 A2 | 8/2009 |
| WO | 2010084641 A1 | 7/2010 |

* cited by examiner

*Primary Examiner* — William Boddie
*Assistant Examiner* — Andrew Schnirel
(74) *Attorney, Agent, or Firm* — Dentons US LLP

(57) ABSTRACT

Disclosed is a method for precisely judging the number of touches. The method includes a step A of reading a touch sensing signal sensed by an $i^{th}$ infrared ray sensor module located at an $i^{th}$ corner (i being a natural number not exceeding 3) of a touch panel, a step B of defining a portion of the touch sensing signal having a signal intensity lower than a predetermined touch recognition threshold signal as a touch recognition signal corresponding to the touches, and a step C of, when the touch recognition signal is recognized as representing one touch and the length of the overall section of the touch recognition signal is within a critical range as a result of analysis of the touch recognition signal, finally judging whether or not the touch recognition signal is recognized as one touch or two touches through re-analysis of the touch recognition signal.

24 Claims, 12 Drawing Sheets

METHOD FOR JUDGING NUMBER OF TOUCHES

This application claims the benefit of Korean Patent Application No. 10-2010-0098000, filed on Oct. 7, 2010, and Korean Patent Application No. 10-2011-0097240, filed Sep. 27, 2011, which are hereby incorporated by reference as if fully set forth herein.

BACKGROUND OF THE INVENTION

1. Field of the Invention

The present invention relates to a display device having a touch panel, and more particularly, to a method for judging the number of touches which precisely judges the number of touches and the position of the touches.

2. Discussion of the Related Art

In general, a touch panel is one of various apparatuses which form an interface between information communication equipment using various displays and a user, and is an input apparatus in which a user interfaces equipment by directly contacting a screen using a hand or a pen.

However, the conventional touch panel has problems, as follows.

If at least two touches applied to a touch display unit are considerably close to each other, or if it is difficult to determine the number of touches and the position of the touches, the conventional touch panel may misrecognize the at least two touches as one touch.

SUMMARY OF THE INVENTION

Accordingly, the present invention is directed to a method for judging the number of touches.

An object of the present invention is to provide a method for judging the number of touches which precisely judges the number of touches and the position of the touches.

To achieve this object and other advantages and in accordance with the purpose of the invention, as embodied and broadly described herein, a method for judging the number of touches includes a step A of reading a touch sensing signal sensed by an $i^{th}$ infrared ray sensor module located at an $i^{th}$ corner (i being a natural number not exceeding 3) of a touch panel; a step B of defining a portion of the touch sensing signal having a signal intensity lower than a predetermined touch recognition threshold signal as a touch recognition signal corresponding to the touches; and a step C of, when the touch recognition signal is recognized as representing one touch and the length of the overall section of the touch recognition signal is within a critical range as a result of analysis of the touch recognition signal, finally judging whether or not the touch recognition signal is recognized as one touch or two touches through re-analysis of the touch recognition signal.

The method may further includes a step B-1 of setting plural variables and constants used in the re-analysis in the step C and initializing values of the variables.

the variables include a variable tmpMax temporally storing the maximum signal intensity value of the touch recognition signal; a variable tmpMin temporally storing a value larger than the maximum signal intensity value of the touch recognition signal; a variable tmpMin1 temporally storing the first minimum signal intensity value of the touch recognition signal in a predetermined first sub-section of the overall section of touch recognition signal; a variable tmpMin2 temporally storing the second minimum signal intensity value of the touch recognition signal in a predetermined second sub-section of the overall section of the touch recognition signal; a variable tmpMaxInd storing a position value corresponding to the maximum signal intensity value stored in the variable tmpMax; a variable tmpMinInd1 storing the minimum position value corresponding to the first minimum signal intensity value stored in the variable tmpMin1; a variable tmpMinInd2 storing the minimum position value corresponding to the second minimum signal intensity value stored in the variable tmpMin2; a variable tmpJ representing a $1/n^{th}$ position value if the length of the overall section of the touch recognition signal is divided into n; a variable tmpK representing whether or not the maximum signal intensity value is present; and a variable tmpL temporarily storing an $m^{th}$ signal intensity value corresponding to an $m^{th}$ position value (m being a natural number) located in the overall section of the touch recognition signal, and a plurality of variables RawImg, wherein the first sub-section and the second sub-section are divided from each other by the variable tmpJ.

The variables tmpMax, tmpMin, tmpMin1, tmpMin2, tamMaxInd, tmpMinInd1, tmpMinInd2 and tmpK are initialized to 0.

The step C includes a step C-1 of questioning whether or not the touch recognition signal is recognized as one touch and whether or not a difference between the minimum position value and the maximum position value of the touch recognition signal is within the critical range; a step C-2 of calculating an initial position value located at a starting point of the overall section of the touch recognition signal and a final position value located as an ending point of the overall section, calculating the length of the overall section by subtracting the initial position value from the final position value, calculating a quotient by dividing the length of the overall section by n and storing a value, obtained by adding the quotient to the initial position value, in the variable tmpJ, if the answer to the question in the step C-1 is yes, storing a predetermined number in the variable tmpMin, storing a signal intensity value corresponding to the value of the variable tmpJ in the variable tmpMax, storing the value of the variable tmpJ in the variable tmpMaxInd, and initializing the variable tmpL to 0; a step C-4 of calculating the number of position values located in the overall section of the touch recognition signal and sequentially outputting the calculated position values from the initial position value to the final position value; a step C-5 of questioning whether or not a value of the variable RawImg corresponding to a current position value supplied from the step C-4 is larger than a predetermined reference value; a step C-6 of updating the value of the variable tmpL with a signal intensity value corresponding to the current position value, if the answer to the question in the step C-5 is yes; a step C-7 of updating the value of the variable tmpL with the reference value, if the answer to the question in the step C-5 is no; a step C-8 of updating the value of the variable RawImg with the value of the variable tmpL from the step C-6 or the step C-7; a step C-9 of questioning whether or not the value of variable tmpL from the step C-8 is smaller than the value of the variable tmpMin; a step C-10 of questioning whether or not the value of the variable tmpK is 0, if the answer to the question in the step C-9 is yes; a step C-11 of updating the value of the variable tmpMin1 with the value of the variable tmpL, updating the value of the variable tmpMin with the value of the variable tmpMin1, and updating the value of the variable tmpMinInd1 with the current position value, if the answer to the question in the step C-10 is yes; a step C-12 of updating the value of the variable tmpMin2 with the value of the variable tmpL, updating the value of the variable tmpMin with the value of the variable tmpMin2, and updating the value of the variable tmpMinInd2 with the current position value, if the answer to the question in the step C-10 is no; a step C-13 of questioning whether or not the current position value is larger than the value of the variable tmpMaxInd if the answer to the question in the step C-9 is no, or after the step C-11 or the step C-12; a step C-14 of questioning whether or not the value of the variable tmpK is 0 and whether or not the value of the variable tmpL is larger than the value of the variable tmpMax, if the answer to the question in the step C-13 is yes; a step C-15 of updating the value of the variable tmpMax with the value of the variable tmpL and updating the value of the tmpMaxInd with the current position value, if the answer to the question in the step C-14 is yes; a step C-16 of questioning whether or not the value of the variable tmpMaxInd is larger than the value of the variable tmpMinInd1 if the answer to the question in the step C-14 is no or after the step C-15; a step C-17 of questioning whether or not the value of the variable tmpK is 0 and whether or not the value of tmpMax−tmpMin is larger than a predetermined first critical value, if the answer to the question in the step C-16 is yes; a step C-18 of updating the value of the variable tmpK with 1 and updating the value of the variable tmpMin with the value of the variable tmpMax, if the answer to the question in the step C-17 is yes; a step C-19 of finally questioning whether or not the value of the variable tmpK is 0, whether or not the value of the variable tmpMaxInd is present, whether or not the value tmpMax−tmpMin1 is larger than the reference value, whether or not the value tmpMax−tmpMin2 is larger than the reference value, whether or not the value of the variable tmpMinInd2 is present, and whether or not the touch recognition signal is recognized as one touch, when the step C-5 to the step C-18 about all position values of the touch recognition signal are executed by returning to the step C4 and then repeating the step C-5 to the step C-18 of the next position value, if the answer to the question in the step C-13 is no, if the answer to the question in the step C-16 is no, if the answer to the question in the step C-17 is no, or after the step C-18; and a step C-20 of finally judging that the touch recognition signal recognized as the one touch is recognized as two touches, calculating the central position value of the first touch from among the two touches based on the initial position value and the final position value of the first touch, and calculating the central position value of the second touch from among the two touches based on the initial position value and the final position value of the second touch, if the answer to the question in the step C-19 is yes, wherein the method is returned to the step A and i in the step A increases by 1, if the answer to the question in the step C-1 is no.

The step C-20 includes setting a starting position value of the first touch to the initial position value; setting an ending position value of the first touch to a value of tmpMaxInd−1; setting a starting position value of the second touch to a value of tmpMaxInd+1; setting an ending position value of the second touch to the final position value; setting the central position value of the first touch to a value obtained by diving the sum of the initial position value and the value of tmpMaxInd−1 by 2; and setting the central position value of the second touch to a value obtained by diving the sum of the value of tmpMaxInd+1 and the final position value by 2.

The method may further include a step of finally judging that the touch recognition signal as the two touches, when the step B, the step B-1 and the steps C-1 to C-20 of each of touch recognition signals sensed by second and third infrared sensor modules are executed and the touch recognition signal sensed by at least one of the infrared sensor modules is judged as representing two touches.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
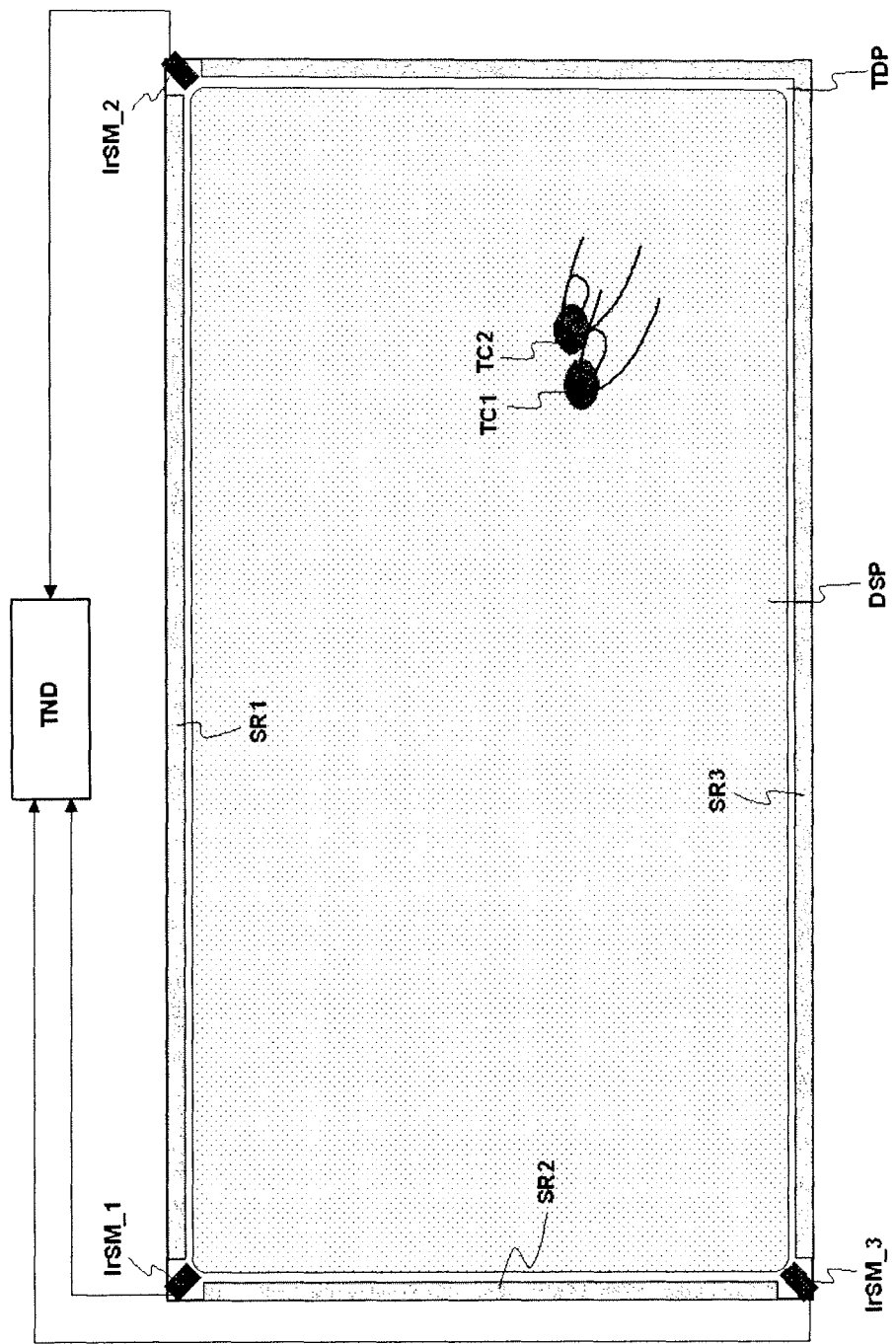
FIG. 1 is a view illustrating a touch assembly integrated touch display apparatus with an algorithm for a method for judging the number of touches in accordance with an embodiment of the present invention.

FIG. 1 is a view illustrating a touch assembly integrated touch display apparatus with an algorithm for a method for judging the number of touches in accordance with an embodiment of the present invention.

The touch assembly integrated touch display apparatus in accordance with the present invention, as shown in FIG. 1, includes a touch display panel TDP, a touch display unit DSP, first to third infrared sensor modules IrSM_1 to IrSM_3, first to third retro-reflective plates SR1 to SR3, and a touch judgment unit TND.

The touch display unit DSP formed at the central portion of the touch display panel TDP displays an image, and receives touches input from a user and displays an image corresponding to the touches. The touch display panel TDP and the touch display unit DSP have a rectangular shape.

The first to third infrared sensor modules IrSM_1 to IrSM_3 are respectively located at corers of the touch display panel TDP. In more detail, the first infrared sensor module IrSM_1 is located at a first corner of the touch display panel TDP to be located between the first retro-reflective plate SR1 and the second retro-reflective plate SR2, the second infrared sensor module IrSM_2 is located at a second corner of the touch display panel TDP to be located between the first retro-reflective plate SR1 and the third retro-reflective plate SR3, and the third infrared sensor module IrSM_3 is located at a third corner of the touch display panel TDP to be located between the second retro-reflective plate SR2 and the third retro-reflective plate SR3.

Each of the first to third infrared sensor modules IrSM_1 to IrSM_3 includes an infrared ray emitting diodes to emit infrared rays, an objective lens to concentrate rays received by each infrared sensor module, a photo sensor to sense the rays concentrated by the objective lens, and an optical filter located on the front or rear surface of the objective lens. The rays received by each infrared sensor module are incident upon the photo sensor via the optical filter and the objective lens. The photo sensor may be a line sensor array including a plurality of light receiving devices. The photo sensor may have a resolution more than 500 pixels in the horizontal direction.

Further, the infrared ray emitting diodes emit infrared rays toward the touch display unit DSP. Here, the infrared rays emitted from the infrared ray emitting diodes are dispersed in a designated angle range. These infrared rays pass across the touch display unit DSP and are incident upon the retro-reflective plates SR1 to SR3. The retro-reflective plates SR1 to SR3 reflect the infrared rays.

The touch display apparatus in accordance with the present invention may use one or two infrared sensor modules. However, in order to suppress generation of a dead zone and a ghost generated when multiple touches occur, three or more infrared sensor modules are preferably provided. That is, when three infrared sensor modules are used, if touches occur on a line connecting the neighboring two infrared sensor modules and it is difficult to precisely judge the number of the touches and the positions of the touches, the remaining infrared sensor module may judges the number of the touches and the positions of the touches at a different angle and thus generation of a dead zone may be prevented. For example, if a touch occurs within an angle range which may not be detected by the first infrared sensor module IrSM_1 and the second infrared sensor module IrSM_2, the third infrared sensor module IrSM_3 may sense the touch within the angle range.

The first to third retro-reflective plates SR1 to SR3 serve to reflect the infrared rays emitted from the respective infrared sensor modules IrSM_1 to IrSM_3. The first retro-reflective plate SR1 is located on a first side of the touch display panel TDP, and the second retro-reflective plate SR2 is located on a second side of the touch display panel TDP. Further, the third retro-reflective plate SR3 is formed in an L shape, and thus one portion of the third retro-reflective plate SR3 is located on a third side of the touch display panel TDP and the other portion of the third retro-reflective plate SR3 is located on a fourth side of the touch display panel TDP. Each of the retro-reflective plates SR1 to SR3 includes a plurality of retro-reflective layers stacked in a row. Each retro-reflective layer includes a prism.

A structure including the above-described first to third infrared sensor modules IrSM_1 to IrSM_3 and first to third retro-reflective plates SR1 to SR3 is referred to as a touch assembly.

The first infrared sensor module IrSM_1 receives infrared rays retro-reflected by the two portions of the third retro-reflective plate SR3. Each of the second and third infrared sensor modules IrSM_2 and IrSM_3 receives infrared rays retro-reflected by at least two retro-reflective plates, and senses infrared rays from the infrared sensor module which is diagonally opposite.

Infrared rays supplied to the respective infrared sensor modules IrSM_1 to IrSM_3 when no touch occur on the touch display unit DSP and infrared rays supplied to the respective infrared sensor modules IrSM_1 to IrSM_3 under the condition that a touch tool, such as a finger, touches a position of the touch display unit DSP and parts of infrared rays emitted from the infrared sensor modules IrSM_1 to IrSM_3 are blocked out by the touch tool have different intensities. The touch judgment unit TND judges whether or not a touch occurs based on the infrared rays sensed by the respective infrared sensor modules IrSM_1 to IrSM_3, and judges the position of the touch if the touch occurs.

This will be described in more detail, as follows.

Figure 2:
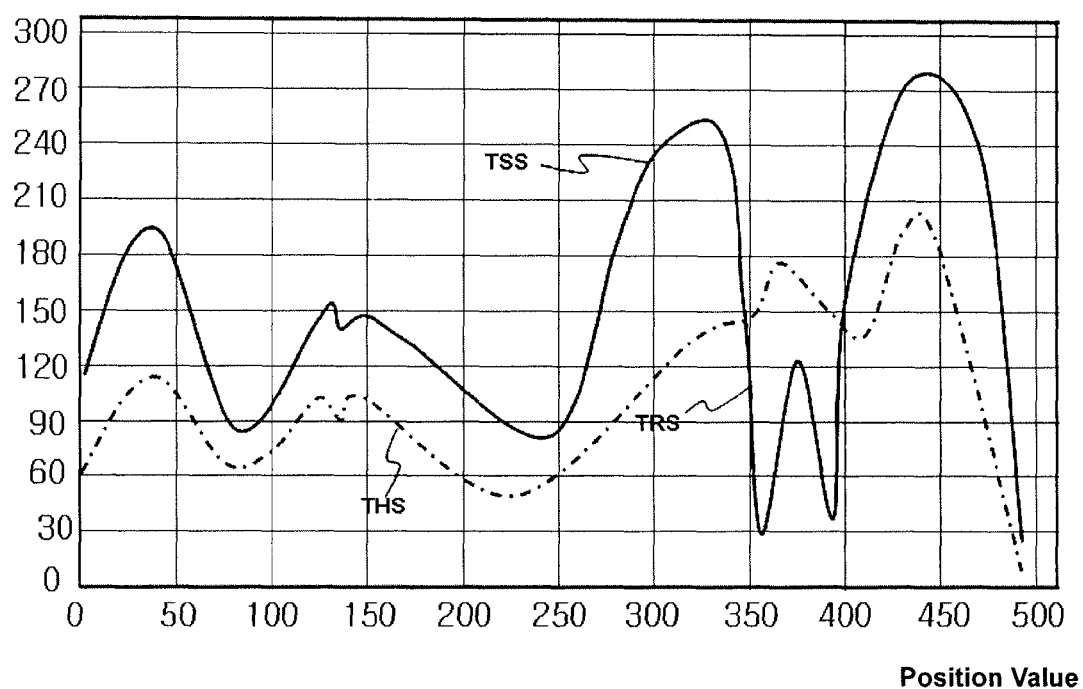
FIG. 2 is a graph illustrating a recognition threshold signal and a touch sensing signal sensed by any one of infrared sensor modules of FIG. 1.

FIG. 2 is a graph illustrating a recognition threshold signal (a dotted line) and a touch sensing signal (an unbroken line) sensed by any one of the infrared sensor modules of FIG. 1.

The X axis of FIG. 2 represents the number of pixels of the photo sensor provided in the infrared sensor module. For example, the number of the pixels may be 500. Here, the numeral illustrated in FIG. 2 represents a serial number of a pixel. That is, 500 pixels include a $1^{st}$ pixel to a $500^{th}$ pixel. For example, the numeral 50 on the X axis of FIG. 5 represents a $50^{th}$ pixel.

Further, the Y axis of FIG. 2 represents intensities of infrared rays received by the respective pixels of the photo sensor. For example, from FIG. 2, it is understood that an intensity of rays received by the $50^{th}$ pixel is about 130.

As shown in FIG. 2, the touch display apparatus recognizes that a designated portion of the touch display unit DSP is touched when the touch sensing signal TSS has a lower value than the recognition threshold signal THS. That is, if a portion of the touch sensing signal TSS having a signal intensity lower than the recognition threshold signal THS is defined as a touch recognition signal TRS, the touch display apparatus may detect the number of touches and the positions of the touches by a generation section of the touch recognition signal TRS. Here, the touch display apparatus may detect the generation section of the touch recognition signal TRS through the serial numbers of the pixels on the X axis coordinate.

Two or more touches TC1 and TC2 may be simultaneously applied to the touch display unit DSP. If the two touches TC1 and TC2 are considerably close to each other, or if it is difficult to determine the number of touches and the position of the touches, the touch display apparatus may misrecognize the two touches as one touch.

In order to solve the above misrecognition problem, the present invention provides an algorithm for a method for judging the number of touches, as follows. Such an algorithm may be applied to the touch judgment unit TND of FIG. 1.

Figure 3:
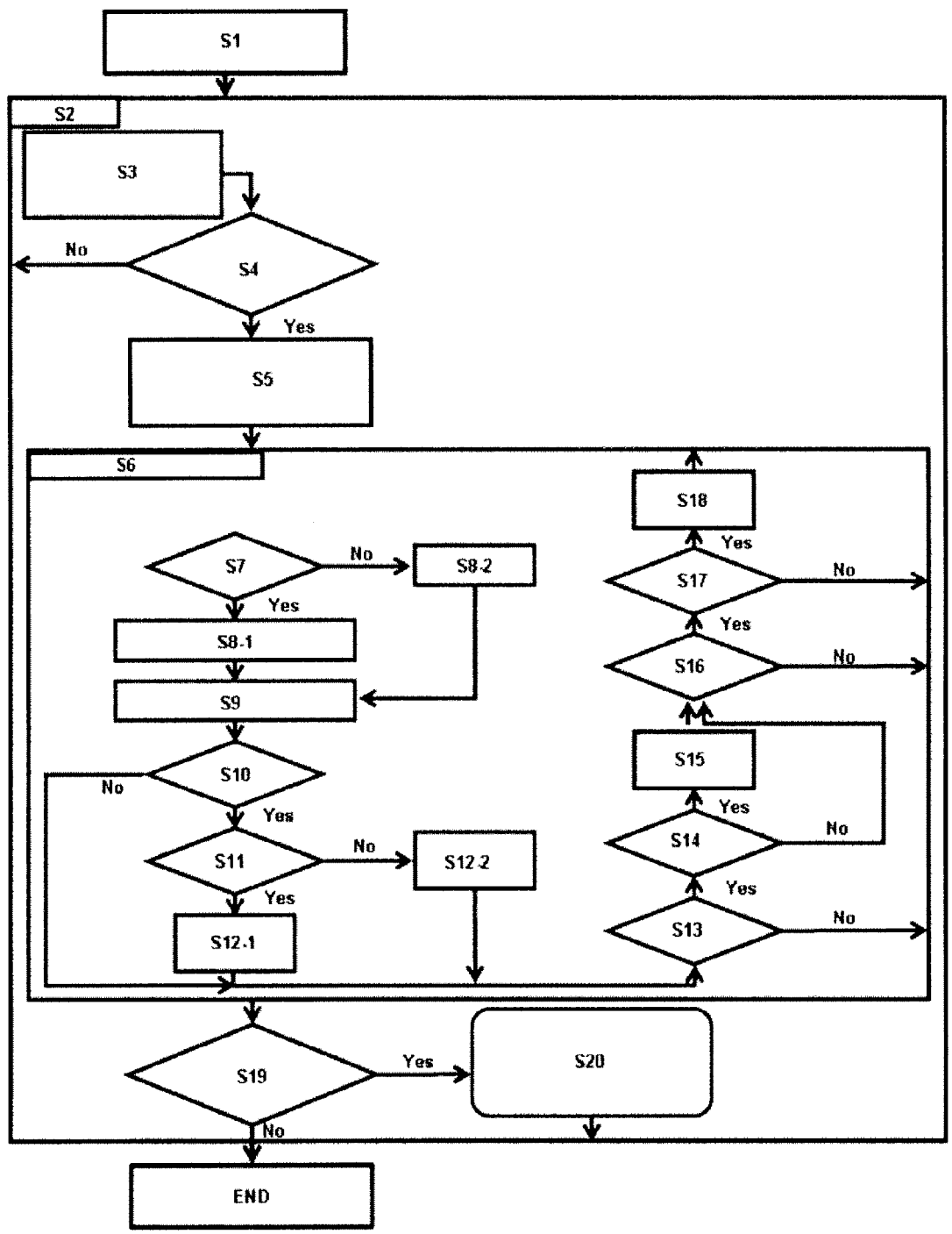
FIG. 3 is a view illustrating the algorithm for the method for judging the number of touches in accordance with the embodiment of the present invention.

FIG. 3 is a view illustrating the algorithm for the method for judging the number of touches in accordance with the embodiment of the present invention, FIGS. 4A to 4D are enlarged views illustrating respective steps of the algorithm of FIG. 3, and FIGS. 5A to 5E are graphs illustrating wave forms of the touch sensing signal relating to the algorithm for the method for judging the number of touches in accordance with the embodiment of the present invention.

As shown in FIG. 3, the algorithm for the method for judging the number of touches generally includes two FOR loops. One FOR loop relates to selection of infrared sensor modules, and the other FOR loop relates to selection of X axis values (pixel's serial numbers, i.e., position values) of the touch recognition signal TRS. The FOR loop regarding the position values belongs to the FOR loop regarding the infrared sensor modules.

Multiple variables and terms are described in FIG. 3 and FIGS. 4A to 4D. These variables and terms will be described, as follows.

A variable i represents the serial number of an infrared sensor module. That is, if i is 0, the infrared sensor module of the serial number 1 (the first infrared sensor module IrSM_1) is selected, if i is 1, the infrared sensor module of the serial number 2 (the second infrared sensor module IrSM_2) is selected, and if i is 2, the infrared sensor module of the serial number 3 (the third infrared sensor module IrSM_3) is selected. In the FOR loop of FIG. 4A, i increases from 0 to a by 1. Here, a is a natural number.

Figure 5A:
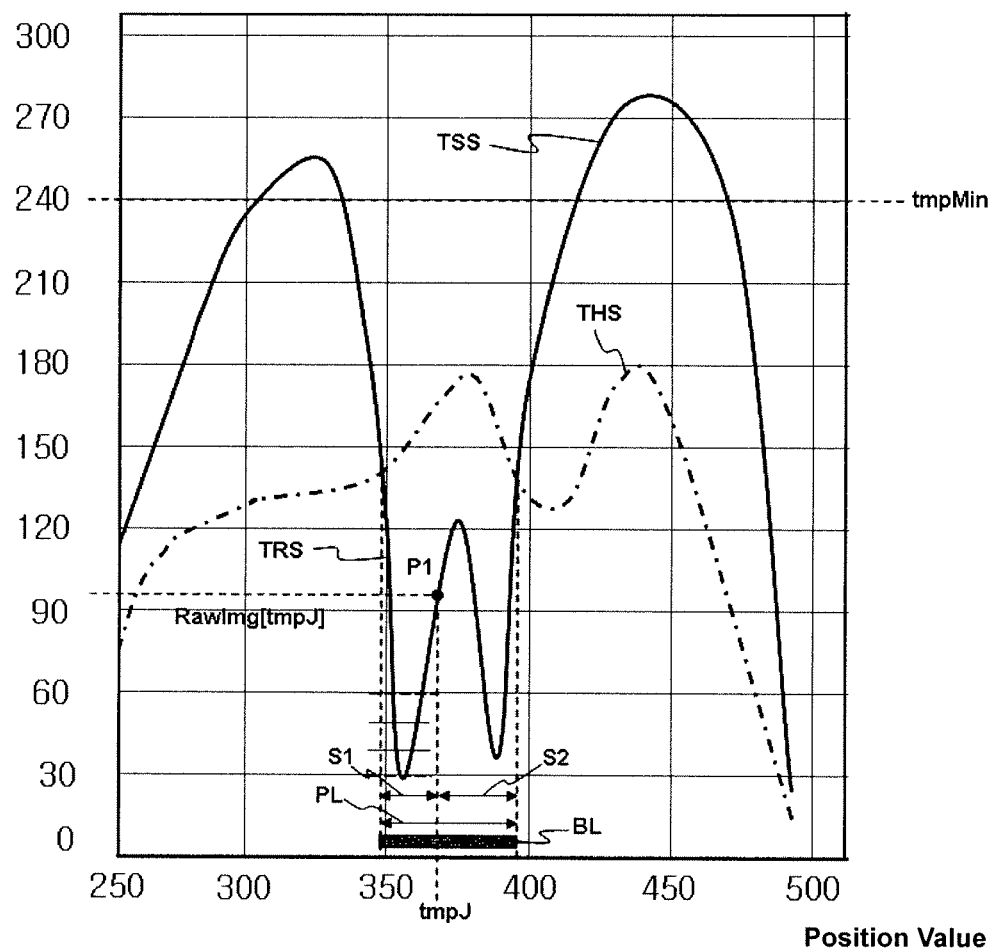
FIGS. 5A to 5E are graphs illustrating wave forms of the touch sensing signal relating to the algorithm for the method for judging the number of touches in accordance with the embodiment of the present invention.

BlobNum represents the number of blobs (pieces) constituting the touch recognition signal TRS within the generation section (X axis position value) of the touch recognition signal TRS. The blobs are signal rods including continuous position values, and the number of the blobs may be 1 or 2 according to wave form characteristics of the touch recognition signal TRS. 1 blob means that the touch recognition signal TRS corresponds to one touch, and two blobs mean that touch recognition signal TRS corresponds to two touches. Here, BlobNum[i] represents the number of blobs constituting the touch recognition signal TRS supplied from the i+1$^{th}$ infrared sensor module within the generation section of the touch recognition signal TRS. That is, the fact that BlobNum[i] is 1 means that the touch recognition signal TRS supplied from the i+1$^{th}$ infrared sensor module includes 1 blob, and the fact that BlobNum[i] is 2 means that the touch recognition signal TRS supplied from the i+1$^{th}$ infrared sensor module includes 2 blobs. For example, as shown in FIG. 5A, if the generation section PL of the touch recognition signal TRS supplied from the first infrared sensor module IrSM_1 corresponds to a section from a position value of 349 to a position value of 397 and wave form characteristics of the touch recognition signal TRS correspond to 1 blob BL, the value of BlobNum[1] of the touch recognition signal TRS becomes 1.

CorMin represents the smallest position value from among the position values of the touch recognition signal TRS. Here, CorMin[i][0] means the minimum position value of the first blob included in the touch recognition signal TRS supplied from the i+1$^{th}$ infrared sensor module. In CorMin[i][0], 0 represents the serial number of the blob. That is, if CorMin includes [0], CorMin means the minimum position value of the first blob, and if CorMin includes [1], CorMin means the minimum position value of the second blob. For example, as shown in FIG. 5A, if the generation section PL of the touch recognition signal TRS supplied from the first infrared sensor module IrSM_1 corresponds to the section from the position value of 349 to the position value of 397 and wave form characteristics of the touch recognition signal TRS correspond to 1 blob BL (i.e., the first blob) within the generation section PL of the touch recognition signal TRS, the value of CorMin[i][0] becomes 349 which is the minimum position value from among the position values within the generation section PL of the touch recognition signal TRS.

CorMax represents the largest position value from among the position values of the touch recognition signal TRS. Here, CorMax[i][0] means the maximum position value of the first blob included in the touch recognition signal TRS supplied from the i+1$^{th}$ infrared sensor module. In CorMax[i][0], 0 represents the serial number of the blob. That is, if CorMax includes [0], CorMax means the maximum position value of the first blob, and if CorMax includes [1], CorMax means the maximum position value of the second blob. For example, as shown in FIG. 5A, if the generation section PL of the touch recognition signal TRS supplied from the first infrared sensor module IrSM_1 corresponds to the section from the position value of 349 to the position value of 397 and the touch recognition signal TRS includes only 1 blob BL (i.e., the first blob) within the generation section PL of the touch recognition signal TRS, the value of CorMax[i][0] becomes 397 which is the maximum position value from among the position values within the generation section PL of the touch recognition signal TRS.

A variable k means position values included in the generation section PL of the touch recognition signal TRS. That is, the variable k becomes any one out of position values corresponding to CorMin[i][0] to CorMax[i][0]-1 (or CorMax[i][0]). The FOR loop of FIG. 4B, k increases from the value corresponding to CorMin[i][0] to the value corresponding to CorMax[i][0] by 1.

RawImg means respective signal intensity values corresponding to the respective position values included in the generation section PL of the touch recognition signal TRS. Here, RawImg[i][k] means the signal intensity value corresponding to the position value of k (k$^{th}$ pixel) included in the touch recognition signal TRS supplied from the i+1$^{th}$ infrared sensor module. For example, as shown in FIG. 5A, if the generation section PL of the touch recognition signal TRS supplied from the first infrared sensor module IrSM_1 corresponds to the section from the position value of 349 to the position value of 397, RawImg[0][349] means a signal intensity value of 140 corresponding to the position value of 349 (349$^{th}$ pixel) included in the touch recognition signal TRS supplied from the first infrared sensor module IrSM_1.

A variable tmpJ represents a 1/n$^{th}$ position value if the length of the generation section PL of the touch recognition signal TRS is divided into n. For example, as shown in FIG. 5A, the variable tmpJ may be a position value corresponding to ⅓ of the above generation section PL. Therefore, tmpJ may be expressed by a value of CorMin[i][0]+(CorMax[i][0]−CorMin[i][0])/d. Here, d is a natural number.

RawImg[i][tmpJ] means a signal intensity value corresponding to the position value of tmpJ. The value of such RawImg may be varied according to the serial number of the infrared sensor module.

A variable tmpL is a variable which temporarily stores any one of the multiple signal intensity values RawImg.

A variable tmpMax is a variable which temporarily stores the maximum signal intensity value of the touch recognition signal TRS.

A variable tmpMin is a variable which temporarily stores a value larger than the maximum signal intensity value of the touch recognition signal TRS. Such a variable tmpMin may be initially set to e. Here, e is a natural number.

A variable tmpMin1 is a variable which temporarily stores the minimum signal intensity value of the touch recognition signal TRS in a predetermined first sub-section S1 (in FIG. 5A) of the overall generation section PL of the touch recognition signal TRS.

A variable tmpMin2 is a variable which temporarily stores the minimum signal intensity value of the touch recognition signal TRS in a predetermined second sub-section S2 (in FIG. 5A) of the overall generation section PL of the touch recognition signal TRS. Here, the first sub-section S1 and the second sub-section S2 are divided from each other by the variable tmpJ. That is, in the generation section PL of the touch recognition signal TRS, a sub-section including position values equal to or smaller than tmpJ is referred to the first sub-section S1, and a sub-section including position values equal to or larger than tmpJ is referred to as the second sub-section S2.

A variable tmpMaxInd is a variable which stores a position value corresponding to the maximum signal intensity value stored in the variable tmpMax.

A variable tmpMinInd1 is a variable which stores the minimum position value corresponding to the minimum signal intensity value stored in the variable tmpMin1.

A variable tmpMinInd2 is a variable which stores the minimum position value corresponding to the minimum signal intensity value stored in the variable tmpMin2.

A variable tmpK is a variable which represents whether or not the maximum signal intensity value is present, and tmpK may have a value of 1 or 0. tmpK having the value of 0 means that the maximum signal intensity value in the generation section PL has not been found out yet, and tmpK having the value of 1 means that the maximum signal intensity value in the generation section PL has been found out.

CorMean represents the central position value of a blob. Here, CorMean[i][0] means the central position value of the first blob of the touch recognition signal TRS supplied from the i+1$^{th}$ infrared sensor module, and CorMean[i][1] means the central position value of the second blob of the touch recognition signal TRS supplied from the i+1$^{th}$ infrared sensor module. The central position value means the mean value through the overall section length of the blob.

Hereinafter, the algorithm for the method for judging the number of touches will be described in derail with reference to FIGS. 4A to 4D.

Figure 4A:
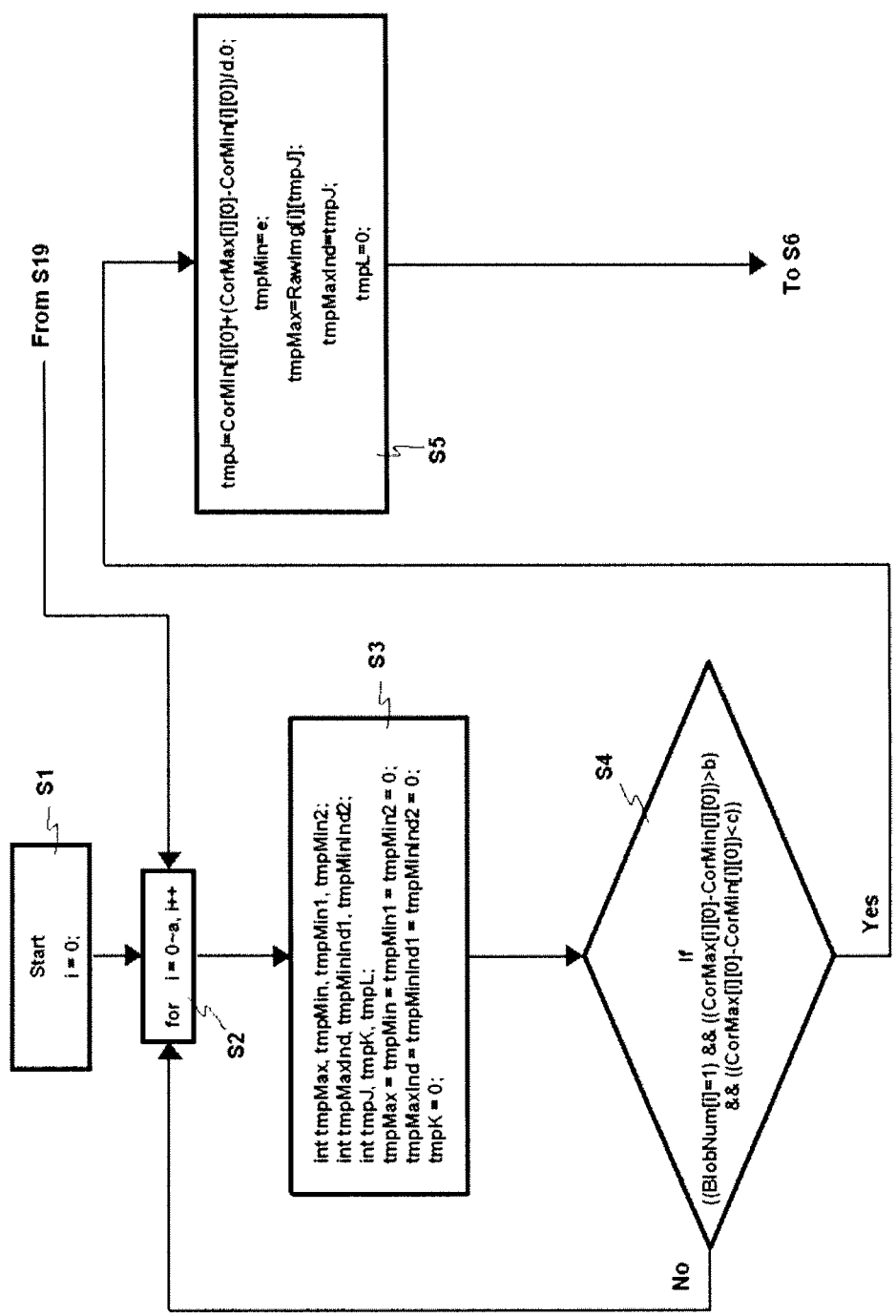
FIGS. 4A to 4D are enlarged views illustrating respective steps of the algorithm of FIG. 3.

First, as shown in a step S1 of FIG. 4A, the first FOR loop is started. In the step S1, i is set to 0. Thereby, the i+1$^{th}$ infrared sensor module is selected.

Thereafter, as shown in a step S2 of FIG. 4A, the range of i is set to 0 to 2. When the step S2 is initially executed, i is set to 0. Then, whenever step S2 is re-executed, the value of i increases by 1 and thus the next infrared sensor modules are sequentially selected. Here, the value of i does not exceed the set maximum value, i.e., 2. On the other hand, if the number of infrared sensor modules is set to 4, the range of i may be set to 0 to 3.

Thereafter, as shown in a step S3 of FIG. 4, the above-described various variables are generated. That is, tmpMax, tmpMin, tmpMin1, tmpMin2, tamMaxInd, tmpMinInd1, tmpMinInd2, tmpJ, tmpK and tmpL are generated. Then, values of the above-enumerated variables except for tmpL are initialized to 0. That is, values of tmpMax, tmpMin, tmpMin1, tmpMin2, tamMaxInd, tmpMinInd1, tmpMinInd2 and tmpK are initialized to 0.

Thereafter, in a step S4 of FIG. 4A, whether or not the touch recognition signal TRS supplied from the infrared sensor module is recognized as one touch (a requirement 4-1), or whether or not a difference between the minimum position value and the maximum position value of the touch recognition signal TRS is within the above critical range (a requirement 4-2) is questioned.

Here, the question in the requirement 4-1 relates to whether or not the touch recognition signal TRS includes one blob in the generation section PL of the touch recognition signal TRS. A method for judging whether or not the touch recognition signal TRS includes one blob or two blobs may use any one of plural algorithms which are well known. For example, whether or not the touch recognition signal TRS includes one blob or two blobs may be judged based on a result of comparison between a difference between two minimum position values of the touch recognition signal TRS supplied from the i+1$^{th}$ infrared sensor module and a predetermined critical value. That is, when the difference between the two minimum positions values is smaller than or equal to the critical value, it is judged that the touch recognition signal TRS includes one blob, and when the difference between the two minimum positions values is larger than the critical value, it is judged that the touch recognition signal TRS includes two blobs. As described above, one blob means that one touch occurs on the touch display unit DSP, and two blobs mean that two touches simultaneously occur on the touch display unit DSP.

The question in the requirement 4-2 relates to, when it is judged that the touch recognition signal TRS includes one blob, whether or not the section length of the blob is within the critical range. For example, the critical range may be set to a range from a position value of b to a position value of c. Here, c and d are natural numbers, and in this case, the question in the requirement 4-2 relates to whether or not the section length of the blob is larger than b and smaller than c.

When even one of the two requirements in the step S4 is not satisfied, the answer to the question in the step S4 is no and thus the above-described step S2 is executed. That is, if the number of blob(s) within the section is 2 or if the number of blob(s) within the section is 1 but the section length of the blob is not within the critical range, processing of the touch recognition signal TRS supplied from the i+1$^{th}$ infrared sensor module (for example, the first infrared sensor module IrSM_1) is not carried out any more and preparation to carry out processing of the next infrared sensor module (for example, the second infrared sensor module IrSM_2) is executed. Then, the above-described step S3 and step S4 are sequentially executed. When the touch recognition signal TRS supplied from the second infrared sensor module IrSM_2) does not satisfy the requirements in the step S4, the step S2 is re-executed and thus preparation to carry out processing of the next infrared sensor module, i.e., the third infrared sensor module IrSM_3, is executed.

On the other hand, when all of the two requirements in the step S4 are satisfied, the answer to the question in the step S4 is yes and thus the next step S5 is executed.

In a step S5, the variables tmpJ, tmpMin, tmpMax, tamMaxInd and tmpL are set to predetermined values.

That is, tmpJ is set to a value obtained by adding the minimum position value to a quotient of a value, obtained by subtracting the minimum position value from the maximum position value within the section, as described above, divided by d. That is, tmpJ has a position value corresponding to CorMin[i][0]+(CorMax[i][0]−CorMin[i][0])/d. For example, as shown in FIG. 5A, if the generation section PL of the touch recognition signal TRS supplied from the first infrared sensor module IrSM_1 corresponds to the section from the position value of 349 to the position value of 397, tmpJ has a position value of '349+(397−349)/d'. Here, since the value of tmpJ is always treated as a natural number, and if the value of tmpJ is a rational number including a decimal point, numerals under the decimal point are thrown out.

tmpMin is set to a high signal intensity value as much as possible. The reason is that the minimum signal intensity value of the touch recognition signal TRS is not precisely known, yet. In the present invention, tmpMin is set to a signal intensity value of e in the step S5. Here, e is a natural number.

tmpL is set to 0. tmpL means a signal intensity value corresponding to a current selected position value k.

Figure 4B:
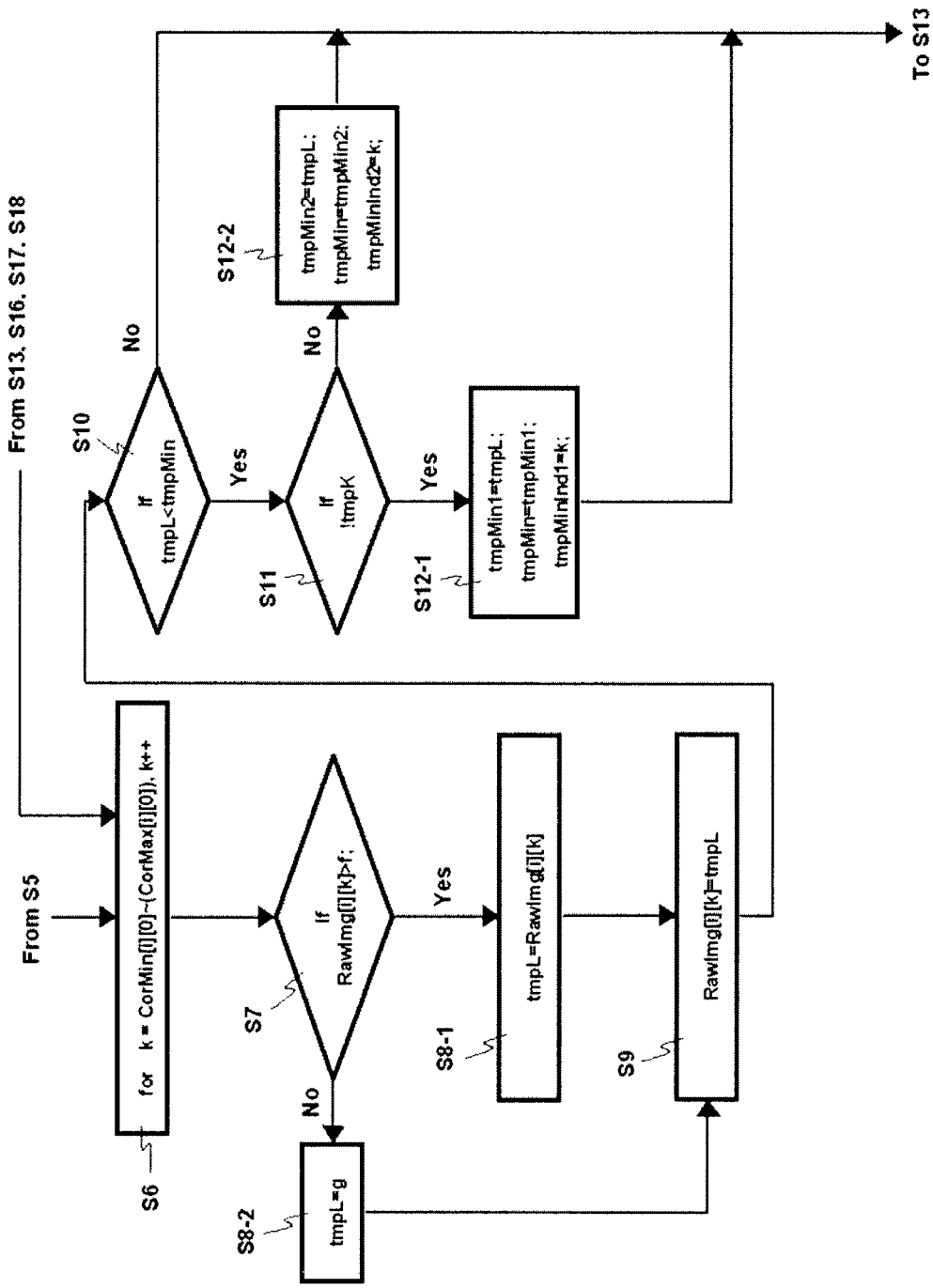

Thereafter, a step S6 shown in FIG. 4B is executed. The second FOR loop is started from the step S6. In the step S6, the range of k is set to the minimum position value CorMin[i][0] to the maximum value CorMax[i][0]. Here, when the step S6 is initially executed, k is set to the minimum position value. For example, as shown in FIG. 5A, if the generation section PL of the touch recognition signal TRS supplied from the first infrared sensor module IrSM_1 corresponds to the section from the position value of 349 to the position value of 397, the value of k is set to the minimum position value of 349. Then, whenever the step S6 is re-started, the value of k increases by 1 and thus the next the position values are sequentially selected. Here, the value of k does not exceed the set maximum value CorMax[i][0].

Thereafter, a step S7 shown in FIG. 4B is executed. In the step S7, whether or not a signal intensity value RawImg[i][k] corresponding to the current position value k is larger than a predetermined first reference value Ref1 (a requirement 5) is questioned. The first reference value Ref1 may be set to f. Here, f is a natural number.

When the requirement 5 in the step S7 is satisfied, the answer to the question in the step S7 is yes, and thus a step S8-1 is executed.

In the step S8-1, the value of tmpL, i.e., 0. is substituted by the value of RawImg[i][k]. The value of RawImg[i][k] means a signal intensity value corresponding to the above-described current position value k (for example, CorMin[i][0]).

Thereafter, in a step S9, the value of RawImg[i][k] is substituted by the value of tmpL.

On the other hand, when the requirement 5 in the step S7 is not satisfied, the answer to the question in the step S7 is no, and instead of the step S8-1, a step S8-2 is executed.

In the step S8-2, the value of tmpL is substituted by a predetermined value g. Here, g is a natural number. The value of g may be same as f (the value of the first reference value). Thereafter, the above-described step S9 is executed. As described above, in the step S9, the value of RawImg[i][k] is substituted by the value of tmpL.

Figure 5B:
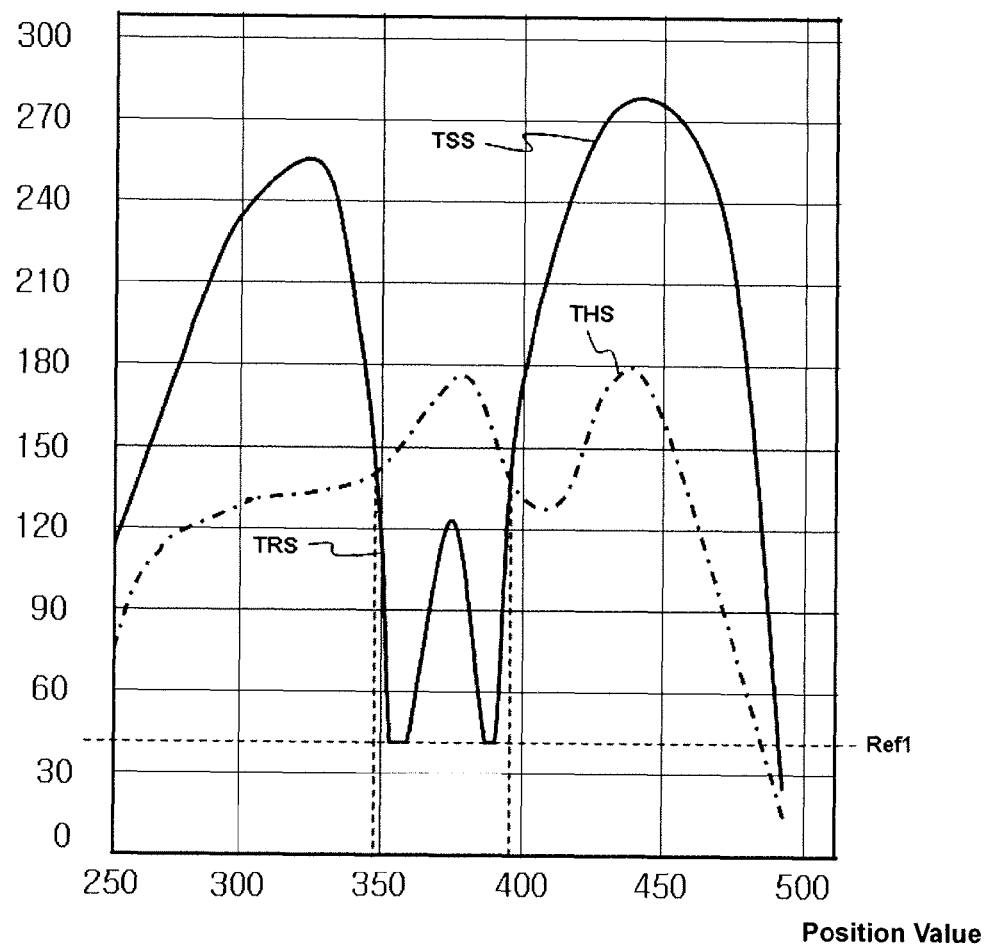

The above-described step S7, step S8-1, step S8-2 and step S9 serve to filter the size of the corresponding signal intensity value. That is, a signal intensity value smaller than or equal to the first reference value Ref1 is judged as noise and is substituted by the first reference value Ref1 or g, and a signal intensity value larger than the first reference value Ref1 is maintained as it was. For example, as shown in FIG. 5B, it is understood that all signal intensity values located under the first reference value Ref1 are filtered out and thus converted into the first reference value Ref1.

The step S9 serves, when the value corresponding to k is converted, to reflect the converted value upon RawImg[i][k].

Thereafter, in a step S10, whether or not the value of tmpL is smaller than the value of tmpMin (a requirement 6) is questioned.

In the step S10, when the requirement 6 in the step S10 is satisfied, the answer to the question in the step S10 is yes, and thus a step S11 is executed. On the other hand, when the requirement 6 in the step S10 is not satisfied, the answer to the question in the step S10 is no, and instead of the step S11, a step S13 (in FIG. 4C) is executed.

In the step S11, whether or not tmpK is 0 (a requirement 7) is questioned.

In the step S11, when the requirement 7 suggested in the step S11 is satisfied, the answer to the question in the step S11 is yes, and thus a step S12-1 is executed. On the other hand, when the requirement 7 suggested in the step S11 is not satisfied, the answer to the question in the step S11 is no, and instead of the step S12-1, a step S12-2 is executed.

In the step S12-1, the value of tmpMin1 is substituted by the value of tmpL, the value of tmpMin is substituted by the value of tmpMin1, and the value of tmpMinInd1 is substituted by the value of k. That is, in the step S12-1, the values of both tmpMin1 and tmpMin are substituted by the value of tmpL until the first minimum signal intensity value in the first sub-section S1 is found out. Further, the value of tmpMinInd1 is substituted by the value of k.

In the step S12-2, the value of tmpMin2 is substituted by the value of tmpL, the value of tmpMin is substituted by the value of tmpMin2, and the value of tmpMinInd2 is substituted by the value of k. That is, in the step S12-2, the values of both tmpMin2 and tmpMin are substituted by the value of tmpL until the second minimum signal intensity value in the second sub-section S2 is found out. Further, the value of tmpMinInd2 is substituted by the value of k.

Hereinafter, the step S10, the step S11 and the step S12-1 will be described in more detail.

Figure 5C:
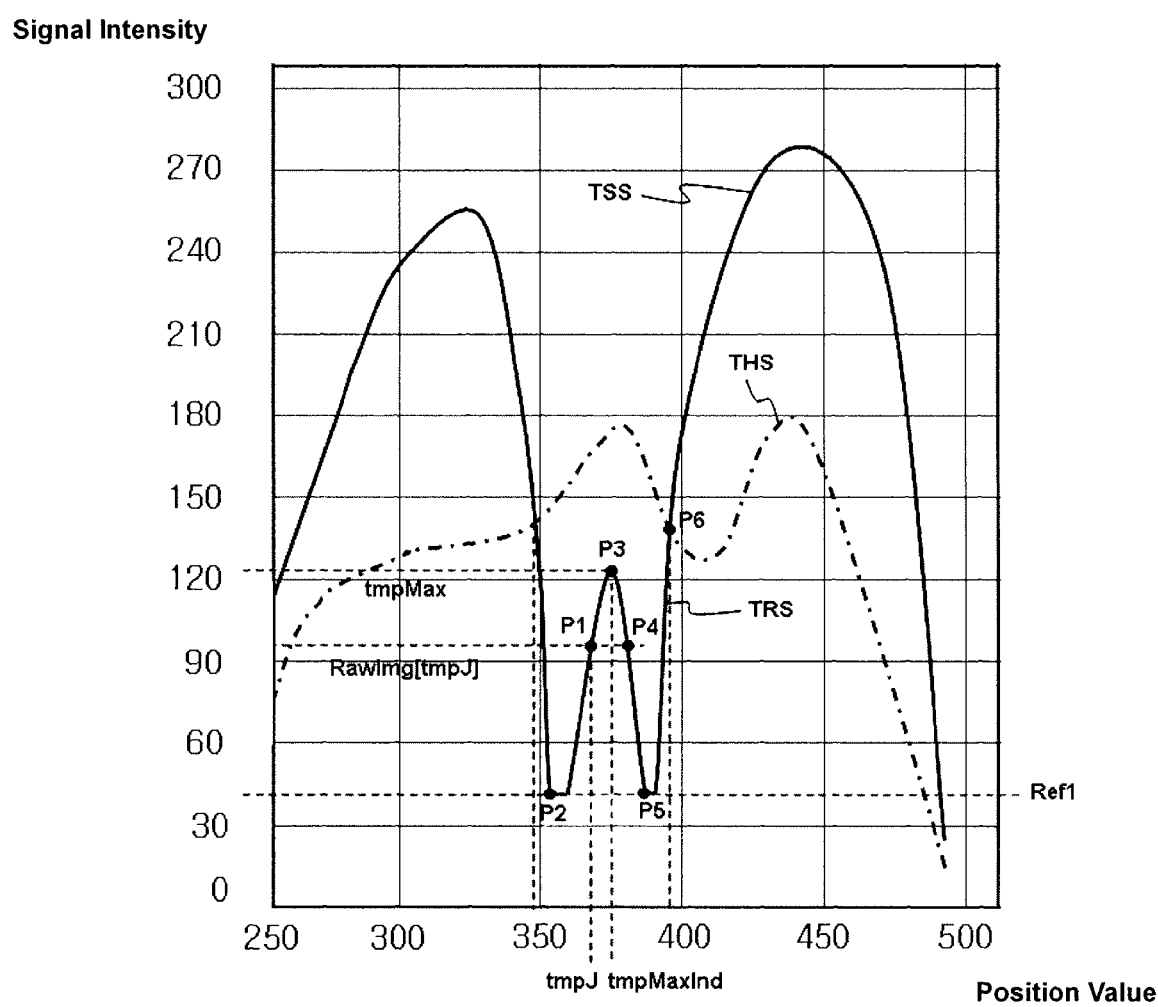
Figure 5D:
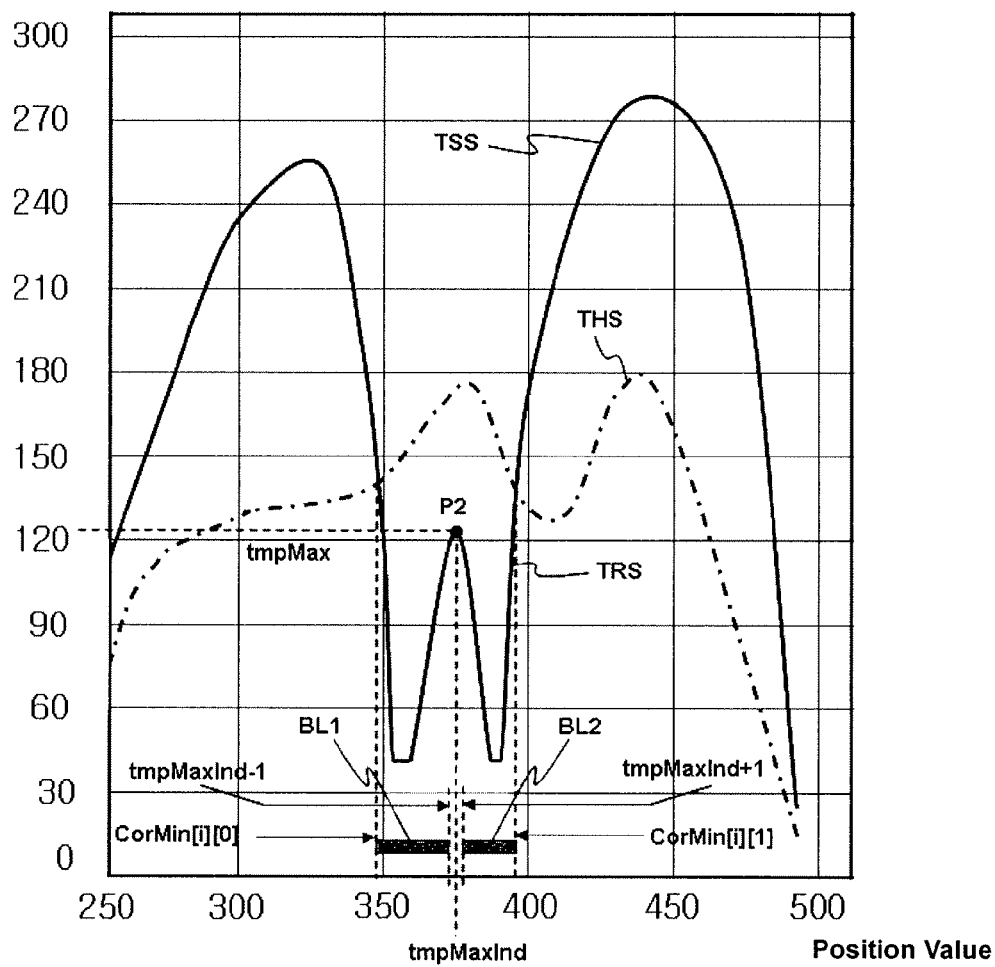
Figure 5E:
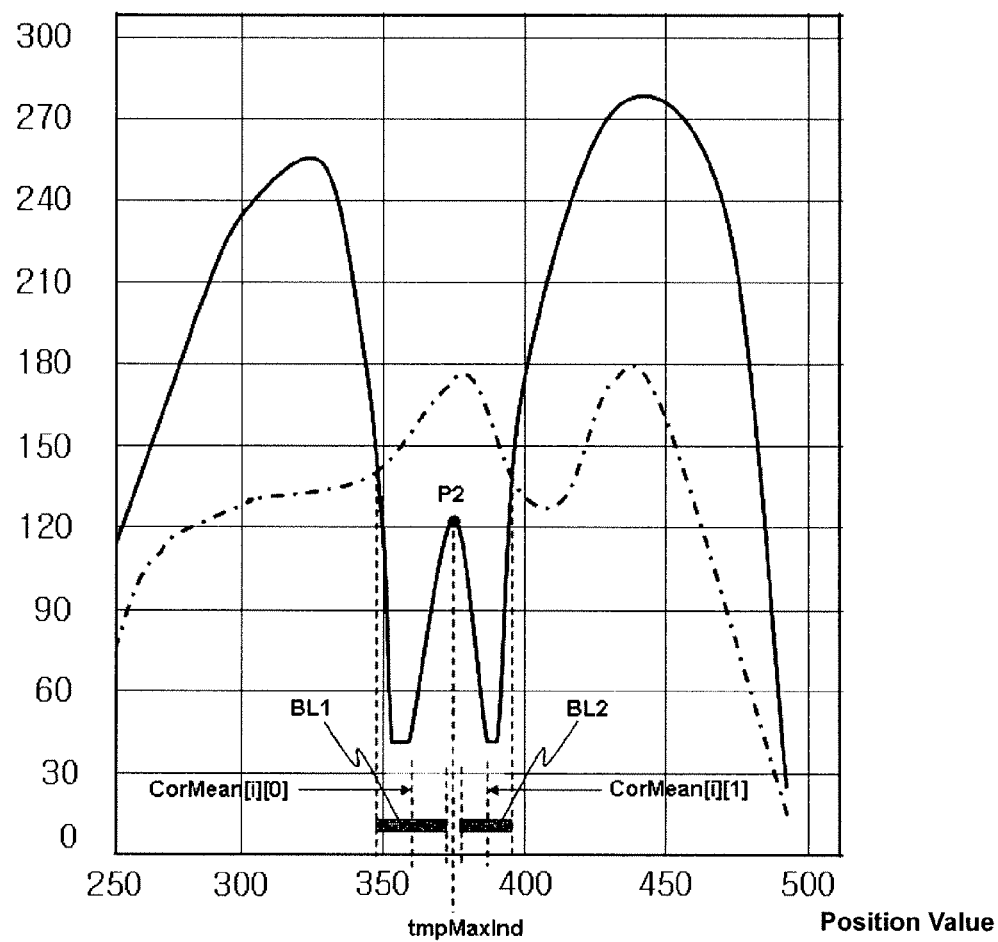

That is, tmpMin is initially set to a large value as much as possible. As shown in FIG. 5C, the signal intensity value tmpL corresponding to the current position value k tends to continuously decrease until the current position value k reaches the position value of a point P2 (a position value corresponding to the smallest signal intensity value within the first sub-section S1 (i.e., the first minimum signal intensity value)) from the minimum position value (for example, the position value of 349) within the first sub-section S1, and, since the value of tmpMin is substituted by the current signal intensity value tmpL corresponding to the current position value k, the current signal intensity value tmpL maintains a state smaller than the value of tmpMin until the current signal intensity value tmpL reaches the first minimum signal intensity value of the point P2. Therefore, since the answer to the question in the step S10 is always yes until the first minimum signal intensity value corresponding to the point P2 within the first sub-section S1 is found out, the step S11 is executed after the step S10. On the other hand, since the current signal intensity value tmpL is equal to or large than tmpMin after the first minimum signal intensity value has been found out, the answer to the question in the step S10 is always no. Therefore, in this case, the step S13 is executed after the step S10.

Further, tmpK is initially set to the value of 0, and is maintained with the value of 0 before the maximum signal intensity value is found out. For example, as shown in FIG. 5C, tmpK is set to the value of 0 before the maximum signal intensity value corresponding to a point P3 is found out. Therefore, since the answer to the question in the step S11 is always yes before the maximum signal intensity value corresponding to the point P3 is found out, the step S12-1 is executed after the step S11.

Figure 4C:
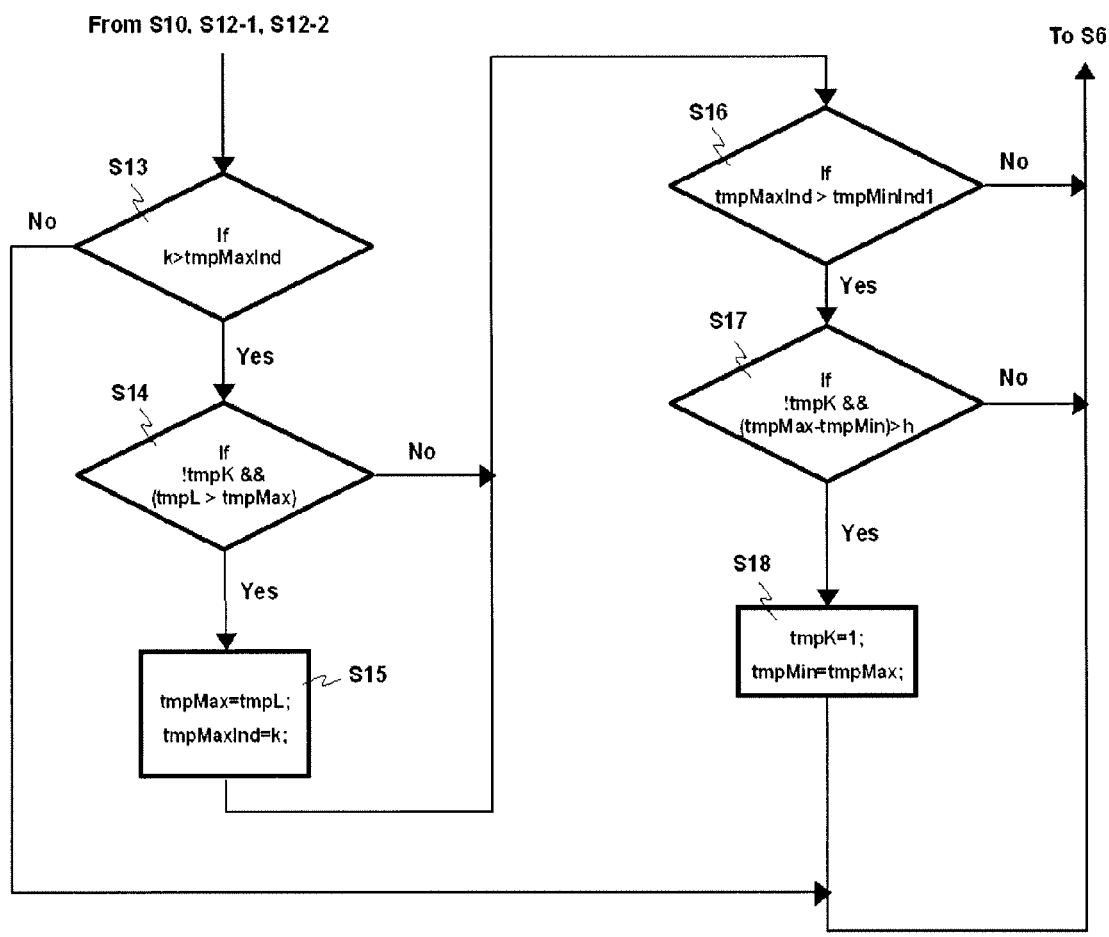
Figure 4D:
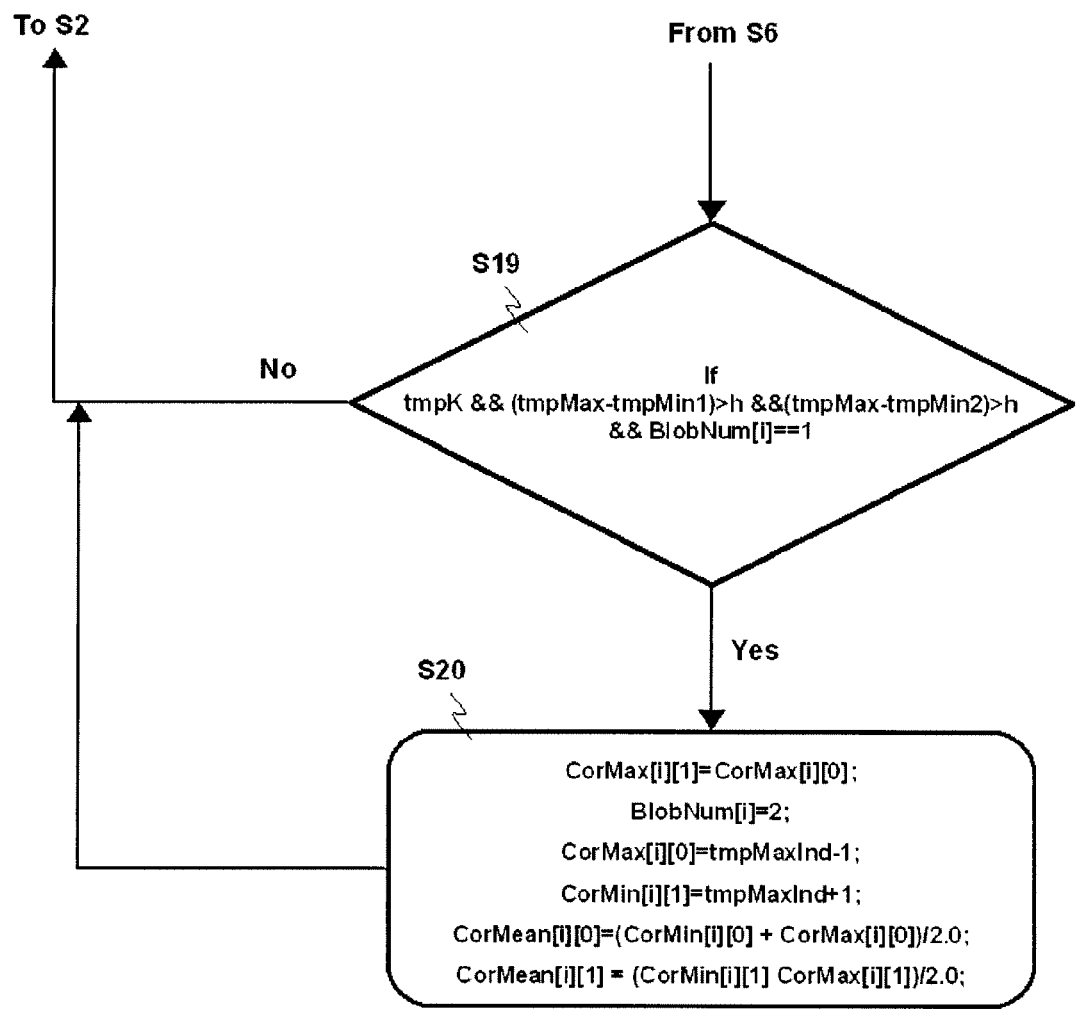

Thereafter, in the step S13 in FIG. 4C, whether or not the current position value k is larger than the value of tmpMaxInd (a requirement 8) is questioned. Here, the value of tmpMaxInd is set to the initial value of tmpJ.

When the requirement 8 in the step S13 is satisfied, the answer to the question in the step S13 is yes, and thus a step S14 is executed. On the other hand, when the requirement 8 in the step S13 is not satisfied, the answer to the question in the step S13 is no, and instead of the step S14, the step S6 is executed. The step 13 serves to find out the maximum signal intensity value corresponding to the point P3 shown in FIG. 5C, and the requirement suggested in the step S13 is satisfied from the moment when the current position value k is larger than the position value tmpJ corresponding to the point P1. Therefore, when the current position value k is smaller than or equal to the value of the tmpJ in the step S13, the answer to the question in the step S13 is no. Accordingly, when the current position value k is smaller than or equal to the value of the tmpJ in the step S13, analysis of the current position value k is not carried out any more, and the step S6 is executed, thereby selecting the k.

On the other hand, when the requirement 8 in the step S13 is satisfied, the step S14 is executed.

In the step S14, whether or not tmpK is 1 (a requirement 9) and whether or not the current signal intensity value tmpL is larger than the value of tmpMax (a requirement 10) are questioned. When both the requirement 9 and the requirement 10 suggested in the step S14 are satisfied, the answer to the question in the step S14 is yes and thus a step S15 is executed. On the other hand, when even any one of the requirement 9 and the requirement 10 suggested in the step S14 is not satisfied, the answer to the question in the step S14 is no and instead of the step S15, a step S16 is executed.

If the step S14 is executed after the step S13, it is judged that the current position value k is larger than the initially set value of tmpJ, and thus the current signal intensity value tmpJ in the step S14 is larger than the value of tmpMax (the signal intensity value corresponding to tmpMaxInd). Further, when the step S14 is initially executed, the maximum intensity value is not yet found out and thus tmpK is still 0. Therefore, when the step S14 is initially executed, the answer to the question in the step S14 is always yes and thus the step S15 is executed. However, when the step S14 is re-executed and the maximum signal intensity value corresponding to the point P3 is found out, tmpK becomes 1, the answer to the question in the step S14 is no, and thus instead of the step S15, the step S16 is executed.

In the step S15, tmpMax is substituted by the current signal intensity value tmpL corresponding to the current position value k, and tmpMaxInd is substituted by the current position value k.

Thereafter, in the step S16, whether or not the value of tmpMaxInd is larger than the value of tmpMinInd1 (a requirement 11) is questioned. The step S16 serves to check again whether or not the value of tmpMaxInd is larger than the value of tmpMinInd1, and the answer to the question in the step S16 is almost yes. When the answer to the question in the step is no, the above-described step S6 is executed, and thus the next k is selected.

Thereafter, in a step S17, whether or not tmpK is 1 (a requirement 12) and whether or not the value of tmpMax−tmpMin is larger than a predetermined second reference value (a requirement 13) are questioned. Here, the second reference value may be set to h. Here, h is a natural number.

When both the requirement 12 and the requirement 13 suggested in the step S17 are satisfied, the answer to the question in the step S17 is yes and thus a step S18 is executed. On the other hand, when even any one of the requirement 12 and the requirement 13 suggested in the step S17 is not satisfied, the answer to the question in the step S17 is no and instead of the step S18, the step S6 is executed. If the step S6 is executed, as described above, the next k is selected.

In the step S17, a difference between the signal intensity value corresponding to the point P3 and the first minimum signal intensity value obtained already is calculated, and judges that the maximum signal intensity value is present when the difference is larger than the second reference value. Here, since the first minimum intensity value is stored in the variables tmpMin1 and tmpMin, tmpMin in the step S17 has the first minimum signal intensity value tmpMin1.

Here, when the step S17 is initially executed, tmpK is not 1 and thus the answer to the question in the step S17 is not yes, yet, and when the difference is larger than the second reference value, the answer to the question in the step S17 becomes yes. At this time, it is supposed that the maximum signal intensity value is initially obtained. Then, a step S18 is executed.

In the step S18, the value of tmpK, i.e., 0, is substituted by 1, and the value of tmpMin is substituted by the value of tmpMax. When the step S18 is initially executed, it is judged that the maximum signal intensity value is present, and the value of tmpK is substituted by 1.

Thereafter, the step S6 is re-executed. Then, the value of k increases and processing of the next position value and the next signal intensity value corresponding thereto is carried out.

After the value of tmpK is substituted by 1, the step S12-2 is executed after the step S11. In the step S12-2, in order to find out the second minimum intensity value which is smallest within the second sub-section S2, the value of tmpMin2 is substituted by the value of tmpL, the value of tmpMin is substituted by the value of tmpMin2, and the value of tmpMinInd2 is substituted by the value of k. A process of finding out the second minimum intensity value is the same as the above-described process of finding out the first minimum intensity value.

Hereinafter, the above process will be described in more detail by applying specific numerical values.

For example, as shown in FIGS. 5A to 5E, let us suppose that the generation section PL of the touch recognition signal TRS supplied from the first infrared sensor module IrSM_1 corresponds to the section from the position value of 349 to the position value of 397, the touch recognition signal TRS includes only one blob within the generation section PL, the value of tmpMin is 240, the first reference value Ref1 is 39, the second reference value is 55, the third reference value 55, the position value and the signal intensity value of the point P1 are respectively 365 and 96, the position value and the signal intensity value of the point P2 are respectively 355 and 39, the position value and the signal intensity value of the point P3 are respectively 377 and 124, the position value and the signal intensity value of the point P4 are respectively 386 and 96, the position value and the signal intensity value of the point P5 are respectively 391 and 39, the position value and the signal intensity value of the point P6 are respectively 397 and 138, and the value of tmpJ is 365.

First, when the current position value k is 349 and the signal intensity value tmpL corresponding to the current position value k of 349 is 142, a coordinate set of k and tmpL may be represented as (k, tmpL). That is, the coordinate set may be represented as (349, 142). These are referred to as a first coordinate set. When the first coordinate set is input to the algorithm, the step S7, the step S8-1, the step S9, the step S10, the step S11, the step S12-1 and the step S13 are sequentially executed based on data of the first coordinate set, and then the step S6 is secondarily re-started. Here, the value of tmpMin in the step S10 is substituted by 142 due to the data of the first coordinate set and a result of processing of the step S12-1.

Thereafter, when the value of k further increases by 1 through the step S6 and thus the current position value k is 350 and the signal intensity value tmpL corresponding to the current position value k of 350 is 112, a coordinate set of k and tmpL may be represented as (350, 112). When the second coordinate set is input to the algorithm, the step S7, the step S8-1, the step S9, the step S10, the step S11, the step S12-1 and the step S13 are sequentially executed based on data of the second coordinate set, and then the step S6 is thirdly re-started. Here, the value of tmpMin in the step S10 is substituted by 112 due to the data of the second coordinate set and a result of processing of the step S12-1.

When the value of k continuously increases in the above manner and thus reaches the position value of 355 corresponding to the point P2, a $7^{th}$ coordinate set may be represented as (355, 39). When the $7^{th}$ coordinate set is input to the algorithm, the step S7, the step S8-2, the step S9, the step S10, the step S11, the step S12-1 and the step S13 are sequentially executed based on data of the seventh coordinate set, and then the step S6 is $8^{th}$ly re-started. Here, the value of tmpMin in the step S10 is substituted by 39 due to the data of the $7^{th}$ coordinate set and a result of processing of the step S12-1. Further, the signal intensity value RawImg[0][355] corresponding to the position value 355 maintains 39 (filtering). Here, the first minimum signal intensity value and the position value corresponding thereto are obtained. The first minimum signal intensity value is stored in tmpMin1, and the position value corresponding thereto is stored in tmpMinInd1. That is, the first minimum signal intensity value is 39 and the position value corresponding thereto is 356. Here, in the step S12-1, the value of tmpMin1 is fixed to 39, the value of tmpMin is fixed to 40, and the value of tmpMinInd1 is fixed to 355.

Thereafter, when the value of k increases by 1, an 8$^{th}$ coordinate set may be represented as (365, 38). When the 8$^{th}$ coordinate set is input to the algorithm, the step S7, the step S8-2, the step S9, the step S10, the step S11 and the step S13 are sequentially executed based on data of the 8$^{th}$ coordinate set, and then the step S6 is 9$^{th}$ly re-started. Here, the value of tmpMin in the step S10 is substituted by 39 due to the data of the 8$^{th}$ coordinate set and a result of processing of the step S12-1. However, the value of tmpMin1 and the value of tmpMin in the step S12-1 respectively maintain 40 in the same manner when the 7$^{th}$ coordinate set is input, and the value of tmpMinInd1 maintains 356. Further, the signal intensity value RawImg[0][356], i.e., 38, corresponding to the position value of 356 is substituted by 40 (filtering).

When the value of k continuously increases in the above manner and thus reaches the position value of 365 corresponding to the point P1, a 17$^{th}$ coordinate set may be represented as (365, 96). When the 17$^{th}$ coordinate set is input to the algorithm, the step S7, the step S8-1, the step S9, the step S10 and the step S13 are sequentially executed based on data of the 17$^{th}$ coordinate set, and then the step S6 is 18$^{th}$ly re-started.

Thereafter, when the value of k increases by 1, an 18$^{th}$ coordinate set may be represented as (366, 97). When the 18$^{th}$ coordinate set is input to the algorithm, the step S7, the step S8-1, the step S9, the step S10, the step S13, the step S14, the step S15, the step S16, the step S17 and the step S18 are sequentially executed based on data of the 18$^{th}$ coordinate set, and then the step S6 is 19$^{th}$ly re-started. Here, the value of tmpMin in the step S10 is substituted by 97, the value of tmpMaxInd in the step S13 is substituted by 366, the value of tmpMax in the step S14 is substituted by 97, the value of tmpMin in the step S17 is substituted by 81, and then the value of tmpK becomes 1 due to the data of the 18$^{th}$ coordinate set, a result of processing of the step S15 and a result of processing of the step S18. Therefore, it is judged that the initial maximum signal intensity value is obtained from the step S18, and then, in order to check whether or not the maximum signal intensity value larger than the initial maximum signal intensity value is present, the value of tmpMin in the step S17 is substituted by the value of tmpMax (i.e., the current input value of k). Here, in the step S15, the value of tmpMax is fixed to 97 and the value of tmpMaxInd is fixed to 366.

Thereafter, when the value of k increases by 1, a 19$^{th}$ coordinate set may be represented as (367, 98). When the 19$^{th}$ coordinate set is input to the algorithm, the step S7, the step S8-1, the step S9, the step S10, the step S13, the step S14, the step S16 and the step S17 are sequentially executed based on data of the 19$^{th}$ coordinate set, and then the step S6 is 33$^{th}$ly re-started. Here, the value of tmpMin in the step S10 maintains the previously obtained value, i.e., 97.

When the value of k continuously increases in the above manner and thus reaches the position value of 377 corresponding to the point P3, a 29$^{th}$ coordinate set may be represented as (377, 124). When the 29$^{th}$ coordinate set is input to the algorithm, the step S7, the step S8-1, the step S9, the step S10, the step S13, the step S14, the step S16 and the step S17 are sequentially executed based on data of the 29$^{th}$ coordinate set, and then the step S6 is 34$^{th}$ly re-started. Here, the value of tmpMin in the step S10 maintains the previously obtained value, i.e., 97.

When the value of k continuously increases in the above manner and thus reaches the position value of 386 corresponding to the point P4, a 38$^{th}$ coordinate set may be represented as (386, 96). When the 38$^{th}$ coordinate set is input to the algorithm, the step S7, the step S8-1, the step S9, the step S10, the step 11, the step S12-2, the step S13, the step S14, the step S16 and the step S17 are sequentially executed based on data of the 38$^{th}$ coordinate set, and then the step S6 is 39$^{th}$ly re-started. Here, tmpMin in the step S10 is substituted by 80 due to the data of the 38$^{th}$ coordinate set and a result of processing of the step S12-2.

When the value of k continuously increases in the above manner and thus reaches the position value of 391 corresponding to the point P5, a 43$^{rd}$ coordinate set may be represented as (391, 39). When the 43$^{rd}$ coordinate set is input to the algorithm, the step S7, the step S8-2, the step S9, the step S10, the step 11, the step S12-2, the step 13, the step S14, the step S16 and the step S17 are sequentially executed based on data of the 43$^{rd}$ coordinate set, and then the step S6 is 44$^{th}$ly re-started. Here, tmpMin in the step S10 is substituted by 39 due to the data of the 43$^{rd}$ coordinate set and a result of processing of the step S12-2.

Thereafter, when the value of k increases by 1, a 44$^{th}$ coordinate set may be represented as (392, 37). When the 44$^{th}$ coordinate set is input to the algorithm, the step S7, the step S8-2, the step S9, the step S10, the step S13, the step S14, the step S16 and the step S17 are sequentially executed based on data of the 44$^{th}$ coordinate set, and then the step S6 is 45$^{th}$ly re-started. Here, the value of tmpMin in the step S10 maintains 39. Further, the signal intensity value RawImg[0][392], i.e., 38, corresponding to the position value 392 is substituted by 39 (filtering).

When the value of k continuously increases in the above manner and thus reaches the position value of 397 corresponding to the point P6, a 49$^{th}$ coordinate set may be represented as (397, 138). When the 49$^{th}$ coordinate set is input to the algorithm, the step S7, the step S8-1, the step S9, the step S10, the step 13, the step S14, the step S16 and the step S17 are sequentially executed based on data of the 49$^{th}$ coordinate set. Here, the value of k is the current maximum value, and thus a step S19 is executed. That is, when the FOR loop of k has been completed, the step S19 is executed.

In the step S19, whether or not tmpK is 1 (a requirement 14), whether or not the value of tmpMax−tmpMin1 exceeds the second reference value (a requirement 15), whether or not the value of tmpMax−tmpMin2 exceeds the third reference value (a requirement 16), and whether or not the number of blobs is 1 (a requirement 17) are questioned. In the step S19, whether or not the above requirement 14 to requirement 16 are satisfied is judged based on the final value of tmpMin1 and the final value of tmpMinInd1 suggested in the step S12-1, the final value of tmpMin2 and the final value of tmpMinInd2 suggested in the step S12-2, the final value of tmpMax and the final value of tmpMaxInd suggested in the step S15 and the value of tmpK suggested in the step S18. When all of the requirement 14 to the requirement 16 are satisfied, a step S20 is executed. However, when even any one of the requirement 14 to the requirement 16 is not satisfied, instead of the step S20, the step S2 is executed, and the next infrared sensor module is selected.

The step S20 serves to divide one blob into two blobs and to calculate the central position values of the respective blobs. That is, when all requirements suggested in the step S19 are satisfied, it is declared in the step S20 that two blobs are finally present. Then, the central position values of the two blobs are calculated. That is, the central position values of the first blob and the second blob are respectively calculated.

CorMax[i][0] means the maximum position value of the initial blob BL included in the touch recognition signal TRS supplied from the i+1$^{th}$ infrared sensor module, and CorMax[i][1] means the maximum position value of the second blob BL2 included in the touch recognition signal TRS supplied from the i+1$^{th}$ infrared sensor module.

CorMean[i][0] means the central position value of the first blob BL1, and CorMean[i][1] means the central position value of the second blob BL2.

In the step S20, the value of CorMax[i][1] is substituted by the value of CorMax[i][0]. Thereby, the maximum position value of the second blob BL2 becomes the maximum position value of the initial blob BL. Therefore, the maximum position value of the second blob BL2 is calculated.

Further, in the step S20, the value of CorMax[i][0] is substituted by the value of tmpMaxInd−1. Such a value means the maximum position value of the first blob BL1. Therefore, the maximum position value of the first blob BL1 is calculated.

Further, in the step S20, the value of CorMin[i][1] is substituted by the value of tmpMaxInd+1. Such a value means the minimum position value of the second blob BL2. Therefore, the minimum position value of the second blob BL2 is calculated.

Further, in the step S20, the value of CorMean[i][0] is substituted by the value of (CorMin[i][0]+CorMax[i][0])/2. That is, the central position value of the first blob BL1 is calculated by dividing a difference between the minimum position value (for example, 349) of the first blob BL1 and the maximum position value tmpMaxInd−1 of the first blob BL1 by 2.

Further, in the step S20, the value of CorMean[i][1] is substituted by the value of (CorMin[i][1]+CorMax[i][1])/2. That is, the central position value of the second blob BL2 is calculated by dividing a difference between the minimum position value tmpMaxInd+1 of the second blob BL2 and the maximum position value (for example, 397) of the second blob BL2 by 2.

When the step S20 has been completed, the step S2 to analyze and process a touch recognition signal TRS supplied from the next infrared sensor module (for example, the second infrared sensor module IrSM_2) is executed. Processes of analyzing and processing the touch recognition signal TRS supplied from the second infrared sensor module IrSM_2 are the same as the above-described processes of analyzing and processing the touch recognition signal TRS supplied from the first infrared sensor module IrSM_1. Thereafter, processes of analyzing and processing a touch recognition signal TRS supplied from the third infrared sensor module IrSM_3 are executed, and the processes of analyzing and processing a touch recognition signal TRS supplied from the third infrared sensor module IrSM_3 are the same as the above-described processes of analyzing and processing the touch recognition signal TRS supplied from the first infrared sensor module IrSM_1.

When analysis and processing of the touch recognition signals TRS supplied from the first to third infrared sensor modules IrSM_1 to IrSM_3 have been completed, the number of touches is judged based on the results of processing of the respective infrared sensor modules IrSM_1 to IrSM_3. That is, if it is judged that at least one touch recognition signal TRS includes two blobs as the results of processing of the three touch recognition signals TRS supplied from the three infrared sensor modules, it may be judged that two touches simultaneously occur on the touch display unit DSP.

For example, if it is judged that the touch recognition signal TRS supplied from the first infrared sensor module IrSM_1 finally includes two blobs through the steps supposed in FIGS. 4A to 4D, it is judged that the touch recognition signal TRS supplied from the second infrared sensor module IrSM_2 finally includes one blob through the steps supposed in FIGS. 4A to 4D, and it is judged that the touch recognition signal TRS supplied from the third infrared sensor module IrSM_3 finally includes one blob through the steps supposed in FIGS. 4A to 4D, it may be judged that two touches simultaneously occur on the touch display unit DSP.

As is apparent from the above description, a method for judging the number of touches in accordance with the present invention judges whether or not a touch recognition signal is recognized as one touch or two touches through re-analysis of a wave form of the touch recognition signal, thereby being capable of precisely determining the number of touches.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A method for judging the number of touches comprising:
a step A of reading a touch sensing signal sensed by an ith infrared ray sensor module located at an ith corner (i being a natural number not exceeding 3) of a touch panel;
a step B of defining a portion of the touch sensing signal as a touch recognition signal corresponding to the touches;
a step C of, when the touch recognition signal in the step B is recognized as representing one touch and the length of an overall section of the touch recognition signal is within a predetermined critical range, precisely judging the number of the touch recognition signal, through re-analysis of the touch recognition signal, wherein the overall section of the touch recognition signal is a section having a signal intensity lower than a predetermined touch recognition threshold signal,
wherein, in the step C, whether or not the touch recognition signal is recognized as one touch or two touches is finally judged through re-analysis of the touch recognition signal; and
a step B-1 of setting plural variables and constants used in the re-analysis in the step C and initializing values of the variables,
wherein the variables include:
a variable tmpMax temporally storing the maximum signal intensity value of the touch recognition signal;
a variable tmpMin temporally storing a value larger than the maximum signal intensity value of the touch recognition signal;
a variable tmpMin1 temporally storing the first minimum signal intensity value of the touch recognition signal in a predetermined first sub-section of the overall section of touch recognition signal;
a variable tmpMin2 temporally storing the second minimum signal intensity value of the touch recognition signal in a predetermined second sub-section of the overall section of the touch recognition signal;
a variable tmpMaxInd storing a position value corresponding to the maximum signal intensity value stored in the variable tmpMax;
a variable tmpMinInd1 storing the minimum position value corresponding to the first minimum signal intensity value stored in the variable tmpMin1;
a variable tmpMinInd2 storing the minimum position value corresponding to the second minimum signal intensity value stored in the variable tmpMin2;
a variable tmpJ representing a $1/n^{th}$ position value if the length of the overall section of the touch recognition signal is divided into n;

a variable tmpK representing whether or not the maximum signal intensity value is present; and
a variable tmpL temporarily storing an $m^{th}$ signal intensity value corresponding to an $m^{th}$ position value (m being a natural number) located in the overall section of the touch recognition signal, and a plurality of variables RawImg,
wherein the first sub-section and the second sub-section are divided from each other by the variable tmpJ.

2. The method according to claim 1, wherein the variables tmpMax, tmpMin, tmpMin1, tmpMin2, tamMaxInd, tmpMinInd1, tmpMinInd2 and tmpK are initialized to 0.

3. The method according to claim 2, wherein the step C includes:
   a step C-1 of questioning whether or not the touch recognition signal is recognized as one touch and whether or not a difference between the minimum position value and the maximum position value of the touch recognition signal is within the critical range;
   a step C-2 of calculating an initial position value located at a starting point of the overall section of the touch recognition signal and a final position value located as an ending point of the overall section, calculating the length of the overall section by subtracting the initial position value from the final position value, calculating a quotient by dividing the length of the overall section by n and storing a value, obtained by adding the quotient to the initial position value, in the variable tmpJ, if the answer to the question in the step C-1 is yes, storing a predetermined number in the variable tmpMin, storing a signal intensity value corresponding to the value of the variable tmpJ in the variable tmpMax, storing the value of the variable tmpJ in the variable tmpMaxInd, and initializing the variable tmpL to 0;
   a step C-4 of calculating the number of position values located in the overall section of the touch recognition signal and sequentially outputting the calculated position values from the initial position value to the final position value;
   a step C-5 of questioning whether or not a value of the variable RawImg corresponding to a current position value supplied from the step C-4 is larger than a predetermined reference value;
   a step C-6 of updating the value of the variable tmpL with a signal intensity value corresponding to the current position value, if the answer to the question in the step C-5 is yes;
   a step C-7 of updating the value of the variable tmpL with the reference value, if the answer to the question in the step C-5 is no;
   a step C-8 of updating the value of the variable RawImg with the value of the variable tmpL from the step C-6 or the step C-7;
   a step C-9 of questioning whether or not the value of variable tmpL from the step C-8 is smaller than the value of the variable tmpMin;
   a step C-10 of questioning whether or not the value of the variable tmpK is 0, if the answer to the question in the step C-9 is yes;
   a step C-11 of updating the value of the variable tmpMin1 with the value of the variable tmpL, updating the value of the variable tmpMin with the value of the variable tmpMin1, and updating the value of the variable tmpMinInd1 with the current position value, if the answer to the question in the step C-10 is yes;
   a step C-12 of updating the value of the variable tmpMin2 with the value of the variable tmpL, updating the value of the variable tmpMin with the value of the variable tmpMin2, and updating the value of the variable tmpMinInd2 with the current position value, if the answer to the question in the step C-10 is no;
   a step C-13 of questioning whether or not the current position value is larger than the value of the variable tmpMaxInd if the answer to the question in the step C-9 is no, or after the step C-11 or the step C-12;
   a step C-14 of questioning whether or not the value of the variable tmpK is 0 and whether or not the value of the variable tmpL is larger than the value of the variable tmpMax, if the answer to the question in the step C-13 is yes;
   a step C-15 of updating the value of the variable tmpMax with the value of the variable tmpL and updating the value of the tmpMaxInd with the current position value, if the answer to the question in the step C-14 is yes;
   a step C-16 of questioning whether or not the value of the variable tmpMaxInd is larger than the value of the variable tmpMinInd1 if the answer to the question in the step C-14 is no or after the step C-15;
   a step C-17 of questioning whether or not the value of the variable tmpK is 0 and whether or not the value of tmpMax−tmpMin is larger than a predetermined first critical value, if the answer to the question in the step C-16 is yes;
   a step C-18 of updating the value of the variable tmpK with 1 and updating the value of the variable tmpMin with the value of the variable tmpMax, if the answer to the question in the step C-17 is yes;
   a step C-19 of finally questioning whether or not the value of the variable tmpK is 1, whether or not the value of the variable tmpMaxInd is present, whether or not the value tmpMax−tmpMin1 is larger than the reference value, whether or not the value tmpMax−tmpMin2 is larger than the reference value, whether or not the value of the variable tmpMinInd2 is present, and whether or not the touch recognition signal is recognized as one touch, when the step C-5 to the step C-18 about all position values of the touch recognition signal are executed by returning to the step C4 and then repeating the step C-5 to the step C-18 of the next position value, if the answer to the question in the step C-13 is no, if the answer to the question in the step C-16 is no, if the answer to the question in the step C-17 is no, or after the step C-18; and
   a step C-20 of finally judging that the touch recognition signal recognized as the one touch is recognized as two touches, calculating the central position value of the first touch from among the two touches based on the initial position value and the final position value of the first touch, and calculating the central position value of the second touch from among the two touches based on the initial position value and the final position value of the second touch, if the answer to the question in the step C-19 is yes,
   wherein the method is returned to the step A and i in the step A increases by 1, if the answer to the question in the step C-1 is no.

4. The method according to claim 3, wherein the step C-20 includes:
   setting a starting position value of the first touch to the initial position value;
   setting an ending position value of the first touch to a value of tmpMaxInd−1;
   setting a starting position value of the second touch to a value of tmpMaxInd+1;

setting an ending position value of the second touch to the final position value;

setting the central position value of the first touch to a value obtained by diving the sum of the initial position value and the value of tmpMaxInd−1 by 2; and setting the central position value of the second touch to a value obtained by diving the sum of the value of tmpMaxInd+1 and the final position value by 2.

5. The method according to claim 4, further comprising a step of finally judging that the touch recognition signal as the two touches, when the step B, the step B-1 and the steps C-1 to C-20 of each of touch recognition signals sensed by second and third infrared sensor modules are executed and the touch recognition signal sensed by at least one of the infrared sensor modules is judged as representing two touches.

6. A method for judging the number of touches comprising:

a step A of reading a touch sensing signal sensed by an ith infrared ray sensor module located at an ith corner (i being a natural number not exceeding 3) of a touch panel;

a step B of defining a portion of the touch sensing signal as a touch recognition signal corresponding to the touches; and a step C of, when the touch recognition signal in the step B is recognized as representing one touch and the length of an overall section of the touch recognition signal is within a predetermined critical range, precisely judging the number of the touch recognition signal, through re-analysis of the touch recognition signal, wherein the overall section of the touch recognition signal is a section having a signal intensity lower than a predetermined touch recognition threshold signal, wherein the step C includes:

a step C-1 of questioning whether or not the touch recognition signal is recognized as one touch and whether or not a difference between a minimum position value and a maximum position value of the touch recognition signal is within the critical range;

a step C-2 of initializing position values to the maximum and minimum points and an intensity value of the signal, temporarily stored, if the answer to the question in the step C-1 is yes;

a step C-3 of judging the touch recognition signal as one touch by judging that it is improper for the touch recognition signal to be divided into two touches, if the answer to the question in the step C-1 is no;

a step C-4 of filtering a noise component of the current signal included in the touch recognition signal after the step C-2;

a step C-5 of questioning whether or not a wave form of the touch recognition signal shows a downward tendency by judging whether or not the intensity value of the current signal provided from the step C-4 is smaller than a minimum intensity value of the previous signal stored just previously;

a step C-6 of questioning whether or not there is the history of a first blob to the previously analyzed touch recognition signal, if the answer to the question in the step C-5 is yes;

a step C-7 of setting the current signal to a starting point of a second blob, if the answer to the question in the step C-6 is yes;

a step C-8 of setting the current signal to a starting point of the first blob, if the answer to the question in the step C-6 is no;

a step C-9 of questioning whether or not the intensity value of the current signal is larger than a predetermined temporary maximum intensity value after the step C-7 or the step C-8;

a step C-10 of judging that there is no history of the first blob and questioning whether or not the intensity value of the current signal is larger than a maximum intensity value of the previous signal stored just previously, if the answer to the question in the step C-9 is yes;

a step of judging that one touch occurs and then executing the step C-3, if the answer to the question in the step C-9 is no;

a step C-11 of updating the intensity value of the current signal with the temporary maximum intensity value and updating a position value of the current signal corresponding to the updated maximum intensity value, if the answer to the question in the step C-10 is yes;

a step C-12 of questioning whether or not the position value of the current signal is larger than a position value corresponding to a predetermined minimum intensity value of the first blob, if the answer to the question in the step C-10 is no or after the step C-11;

a step C-13 of questioning whether or not a difference between the maximum position value set in the step C-11 and the minimum position value is more than a predetermined value deviating from an error range, if the answer to the question in the step C-12 is yes;

a step of judging that one touch occurs and then executing the step C-3, if the answer to the question in the step C-12 is no;

a step C-14 of notifying that a blob history occurs and substituting the maximum intensity value set in the step C-11 for the temporary minimum intensity value stored just prior to the first blob, if the answer to the question in the step C-13 is yes;

a step of judging that one touch occurs and then executing the step C-3, if the answer to the question in the step C-13 is no;

a step C-15 of questioning whether or an occurred blob satisfies a requirement corresponding to two touches after the step C-14;

a step C-16 of calculating maximum position values, minimum position values and average position values of divided blobs and announcing that the number of blobs is two, if the answer to the question in the step C-15 is yes; and a step of executing the step C-3, if the answer to the question in the step C-15 is no.

7. The method according to claim 6, further comprising a step B-1 of setting plural variables and constants used in the re-analysis in the step C and initializing values of the variables.

8. The method according to claim 7, wherein the variables include:

a variable tmpMax finally storing the maximum signal intensity value of the touch recognition signal;

a variable tmpMin initially storing a value larger than the maximum signal intensity value of the touch recognition signal;

a variable tmpMin1 finally storing the first minimum signal intensity value of the touch recognition signal in a predetermined first sub-section of the overall section of touch recognition signal;

a variable tmpMin2 finally storing the second minimum signal intensity value of the touch recognition signal in a predetermined second sub-section of the overall section of the touch recognition signal;

a variable tmpMaxInd storing a position value corresponding to the maximum signal intensity value stored in the variable tmpMax;
a variable tmpMinInd1 storing the minimum position value corresponding to the first minimum signal intensity value stored in the variable tmpMin1;
a variable tmpMinInd2 storing the minimum position value corresponding to the second minimum signal intensity value stored in the variable tmpMin2;
a variable tmpJ representing a 1/nth position value if the length of the overall section of the touch recognition signal is divided into n;
a variable tmpK representing whether or not the maximum signal intensity value is present; and
a variable tmpL temporarily storing an mth signal intensity value corresponding to an mth position value (m being a natural number) located in the overall section of the touch recognition signal, and a plurality of variables RawImg,
wherein the first sub-section and the second sub-section are divided from each other by the variable tmpJ.

9. The method according to claim 8, wherein the step C-2 includes:
calculating an initial position value located at a starting point of the overall section of the touch recognition signal and a final position value located as an ending point of the overall section;
calculating the length of the overall section by subtracting the initial position value from the final position value;
calculating a quotient by dividing the length of the overall section by n;
storing a value, obtained by adding the quotient to the initial position value, in the variable tmpJ;
storing a predetermined number in the variable tmpMin;
storing a signal intensity value corresponding to the value of the variable tmpJ in the variable tmpMax;
storing the value of the variable tmpJ in the variable tmpMaxInd; and
initializing the variable tmpL to 0.

10. The method according to claim 8, wherein the step C-4 includes:
a step C-4-1 of questioning whether or not a value of the variable RawImg corresponding to a current position value is larger than a predetermined reference value;
a step C-4-2 of updating the value of the variable tmpL with a signal intensity value corresponding to the current position value, if the answer to the question in the step C-4-1 is yes;
a step C-4-3 of updating the value of the variable tmpL with the reference value, if the answer to the question in the step C-4-1 is no; and
a step C-4-4 of updating the value of the variable RawImg with the value of the variable tmpL from the step C-4-2 or the step C-4-3.

11. The method according to claim 10, wherein the step C-5 includes questioning whether or not the value of variable tmpL from the step C-4-4 is smaller than the value of the variable tmpMin.

12. The method according to claim 11, wherein the step C-6 includes questioning whether or not the value of the variable tmpK is 0, if the answer to the question in the step C-5 is yes.

13. The method according to claim 12, wherein the step C-7 includes updating the value of the variable tmpMin1 with the value of the variable tmpL, updating the value of the variable tmpMin with the value of the variable tmpMin1, and updating the value of the variable tmpMinInd1 with the current position value, if the answer to the question in the step C-6 is yes.

14. The method according to claim 13, wherein the step C-8 includes updating the value of the variable tmpMin2 with the value of the variable tmpL, updating the value of the variable tmpMin with the value of the variable tmpMin2, and updating the value of the variable tmpMinInd2 with the current position value, if the answer to the question in the step C-6 is no.

15. The method according to claim 14, wherein the step C-9 includes questioning whether or not the current position value is larger than the value of the variable tmpMaxInd, if the answer to the question in the step C-5 is no, or after the step C-7 or the step C-8.

16. The method according to claim 15, wherein the step C-10 includes questioning whether or not the value of the variable tmpK is 0 and whether or not the value of the variable tmpL is larger than the value of the variable tmpMax, if the answer to the question in the step C-9 is yes.

17. The method according to claim 16, wherein the step C-11 includes updating the value of the variable tmpMax with the value of the variable tmpL and updating the value of the tmpMaxInd with the current position value, if the answer to the question in the step C-10 is yes.

18. The method according to claim 17, wherein the step C-12 includes questioning whether or not the value of the variable tmpMaxInd is larger than the value of the variable tmpMinInd1, if the answer to the question in the step C-10 is no or after the step C-15.

19. The method according to claim 18, wherein the step C-13 includes questioning whether or not the value of the variable tmpK is 0 and whether or not the value of tmpMax−tmpMin is larger than a predetermined first critical value, if the answer to the question in the step C-12 is yes.

20. The method according to claim 19, wherein the step C-14 includes updating the value of the variable tmpK with 1 and updating the value of the variable tmpMin with the value of the variable tmpMax, if the answer to the question in the step C-13 is yes.

21. The method according to claim 20, wherein the step C-15 includes finally questioning whether or not the value of the variable tmpK is 1, whether or not the value of the variable tmpMaxInd is present, whether or not the value tmpMax−tmpMin1 is larger than the reference value, whether or not the value tmpMax−tmpMin2 is larger than the reference value, whether or not the value of the variable tmpMinInd2 is present, and whether or not the touch recognition signal is recognized as one touch.

22. The method according to claim 21, wherein the step C-16 includes finally judging that the touch recognition signal recognized as the one touch is recognized as two touches, calculating the central position value of the first touch from among the two touches based on the initial position value and the final position value of the first touch, and calculating the central position value of the second touch from among the two touches based on the initial position value and the final position value of the second touch, if the answer to the question in the step C-15 is yes.

23. The method according to claim 22, wherein the step C-16 further includes setting a starting position value of the first touch to the initial position value;
setting an ending position value of the first touch to a value of tmpMaxInd−1;
setting a starting position value of the second touch to a value of tmpMaxInd+1;

setting an ending position value of the second touch to the final position value;

setting the central position value of the first touch to a value obtained by diving the sum of the initial position value and the value of tmpMaxInd−1 by 2; and setting the central position value of the second touch to a value obtained by diving the sum of the value of tmpMaxInd+1 and the final position value by 2.

24. The method according to claim 23, further comprising a step of finally judging that the touch recognition signal as the two touches, when the step B, the step B-1 and the steps C-1 to C-16 of each of touch recognition signals sensed by second and third infrared sensor modules are executed and the touch recognition signal sensed by at least one of the infrared sensor modules is judged as representing two touches.

* * * * *